United States Patent
Oh et al.

(10) Patent No.: US 10,349,095 B2
(45) Date of Patent: Jul. 9, 2019

(54) TRANSMISSION DEVICE FOR PROCESSING VIDEO DATA RELATED TO HDR/SDR AND METHOD FOR CONTROLLING THE SAME

(71) Applicant: LG ELECTRONICS INC., Seoul (KR)

(72) Inventors: Sejin Oh, Seoul (KR); Jongyeul Suh, Seoul (KR); Soojin Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/568,638

(22) PCT Filed: May 9, 2016

(86) PCT No.: PCT/KR2016/004820
§ 371 (c)(1),
(2) Date: Oct. 23, 2017

(87) PCT Pub. No.: WO2016/178549
PCT Pub. Date: Nov. 10, 2016

(65) Prior Publication Data
US 2018/0176609 A1    Jun. 21, 2018

Related U.S. Application Data

(60) Provisional application No. 62/158,494, filed on May 7, 2015, provisional application No. 62/159,911, filed on May 11, 2015.

(51) Int. Cl.
*H04N 7/173* (2011.01)
*H04N 21/2343* (2011.01)
(Continued)

(52) U.S. Cl.
CPC .......... *H04N 21/2343* (2013.01); *H04N 7/01* (2013.01); *H04N 7/015* (2013.01); *H04N 21/236* (2013.01);
(Continued)

(58) Field of Classification Search
CPC ................................................. H04N 21/2343
See application file for complete search history.

(56) References Cited

U.S. PATENT DOCUMENTS

| 2012/0173623 | A1 | 7/2012 | Vanderveen |
| 2015/0195327 | A1* | 7/2015 | Bouazizi ............. H04L 65/4076 709/219 |

(Continued)

FOREIGN PATENT DOCUMENTS

| KR | 10-2006-0081375 A | 7/2006 |
| KR | 10-2008-0003881 A | 1/2008 |

(Continued)

*Primary Examiner* — Gigi L Dubasky
(74) *Attorney, Agent, or Firm* — Birch, Stewart, Kolasch & Birch, LLP

(57) ABSTRACT

A method for transmitting a broadcast signal is presented. In the method for transmitting a broadcast signal, according to the present invention, presented is a system, which can support a next-generation broadcast service in an environment supporting a next-generation hybrid broadcast using a terrestrial broadcast network and an Internet network. In addition, presented is an effective signaling method for covering both a terrestrial broadcast network and an Internet network in an environment supporting a next-generation hybrid broadcast.

12 Claims, 37 Drawing Sheets

(51) Int. Cl.
*H04N 7/01* (2006.01)
*H04N 7/015* (2006.01)
*H04N 21/236* (2011.01)
*H04N 21/238* (2011.01)
*H04N 21/2665* (2011.01)
*H04N 21/2362* (2011.01)
*H04N 21/845* (2011.01)
*H04N 21/61* (2011.01)

(52) U.S. Cl.
CPC ....... *H04N 21/238* (2013.01); *H04N 21/2362* (2013.01); *H04N 21/2665* (2013.01); *H04N 21/8456* (2013.01); *H04N 21/6112* (2013.01); *H04N 21/6125* (2013.01)

(56) References Cited

U.S. PATENT DOCUMENTS

2016/0155470 A1* 6/2016 Toma ................. G11B 20/1217
　　　　　　　　　　　　　　　　　　　　　386/355
2016/0293135 A1* 10/2016 Nakajima .............. G09G 5/006

FOREIGN PATENT DOCUMENTS

WO　　WO 2007/106211 A1　　9/2007
WO　　WO 2012/011722 A2　　1/2012

\* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|         SLT | var | Sec. 6.3 |
|         break; | | |
|      case 0x02: | | |
|         RRT | var | See Annex F |
|         break; | | |
|      case 0x03: | | |
|         System Time | var | Sec. 6.4 |
|         break; | | |
|      case 0x04: | | |
|         CAP | var | Sec. 6.5 |
|         break; | | |
|      default: | | |
|         reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

— t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | | | | | Use |
|---|---|---|---|---|---|
| bundleDescription | | | | | |
| | userServiceDescription | | | | |
| | | @globalServiceID | | | M |
| | | @serviceID | | | M |
| | | Name | | | 0..N |
| | | | @lang | | CM |
| | | serviceLanguage | | | 0..N |
| | | contentAdvisoryRating | | | 0..1 |
| | | Channel | | | 1 |
| | | | @serviceGenre | | 0..1 |
| | | | @serviceIcon | | 1 |
| | | | ServiceDescription | | 0..N |
| | | | | @serviceDescrText | 1 |
| | | | | @serviceDescrLang | 0..1 |
| | | mpuComponent | | | 0..1 |
| | | | @mmtPackageId | | 1 |
| | | | @nextMmtPackageId | | 0..1 |
| | | routeComponent | | | 0..1 |
| | | | @sTSIDUri | | 1 |
| | | | @sTSIDDestinationIpAddress | | 0..1 |
| | | | @sTSIDDestinationUdpPort | | 1 |
| | | | @sTSIDSourceIpAddress | | 1 |
| | | | @sTSIDMajorProtocolVersion | | 0..1 |
| | | | @sTSIDMinorProtocolVersion | | 0..1 |
| | | broadbandComponent | | | 0..1 |
| | | | @fullMPDUri | | 1 |
| | | ComponentInfo | | | 1..N |
| | | | @ComponentType | | 1 |
| | | | @ComponentRole | | 1 |
| | | | @ComponentProtectedFlag | | 0..1 |
| | | | @ComponentId | | 1 |
| | | | @ComponentName | | 0..1 |

FIG. 6
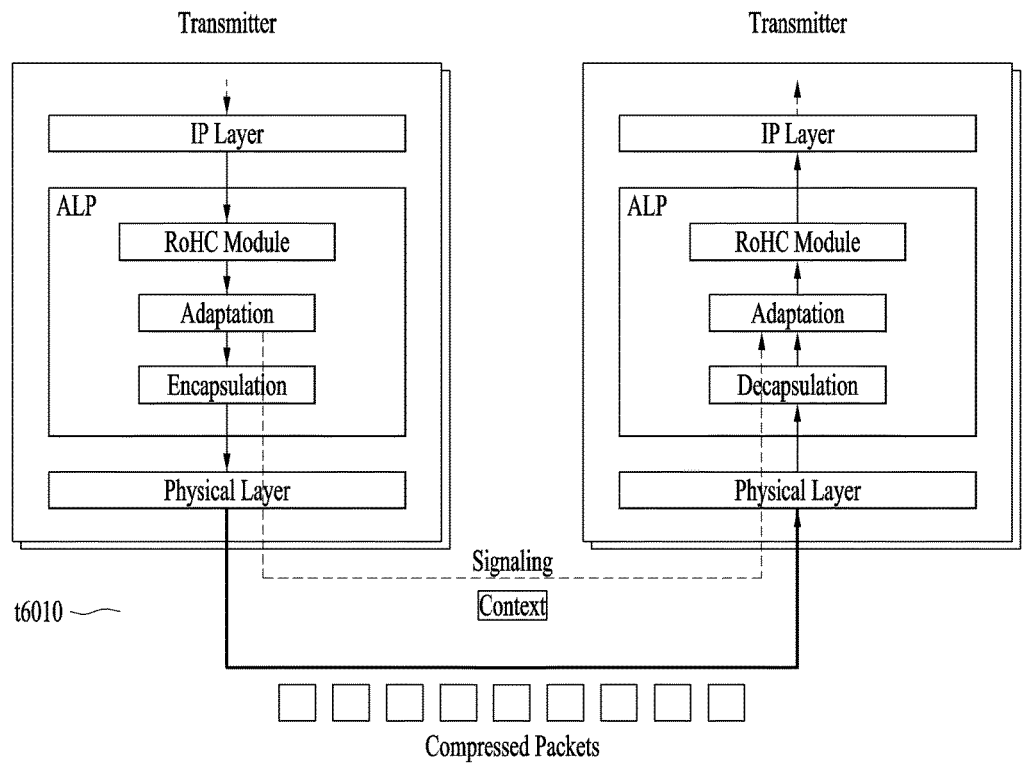
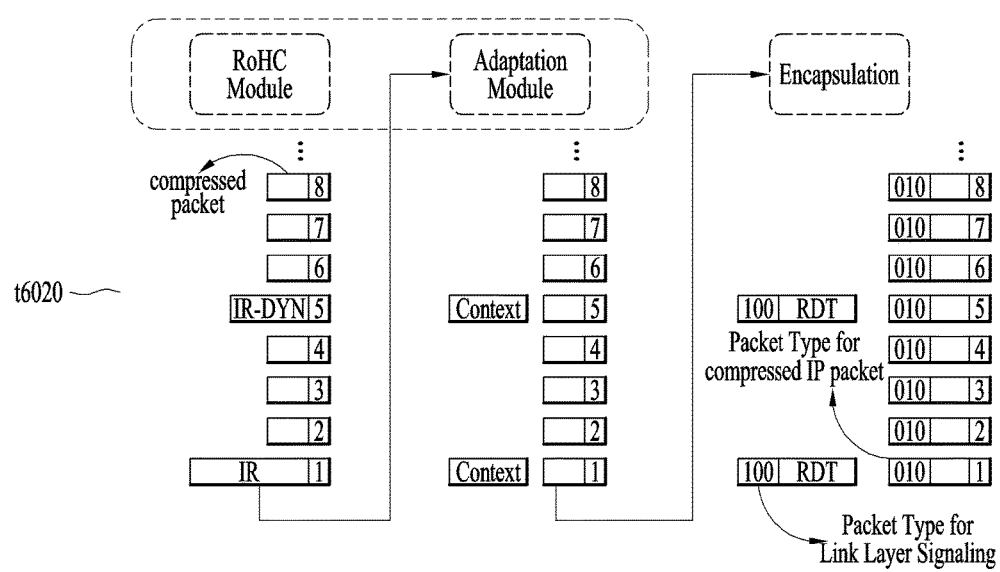

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i + +) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag = = "1") { | | |
|          SID | 8 | uimsbf |
|       } | | |
|       if (compressed_flag = = "1') { | | |
|          context_id | 8 | uimsbf |
|       } | | |
|    } | | |
| } | | |

```
aligned(8) class HDRConfigurationBox extends FullBox('hdrc', version=0, 0) {
    HDRConfiguration           hdr_config;
{
```

```
aligned(8) class HDRConfiguration (bit(24) hdr_flags=0){
    unsigned int(8)         OETF_type;
    unsigned int(32)        max_mastering_display_luminance;
    unsigned int(32)        min_mastering_display_luminance;
    unsigned int(1)         hdr_type_transition_flag;
    unsigned int(1)         hdr_sdr_transition_flag;
    unsigned int(1)         sdr_hdr_transition_flag;
    unsigned int(1)         sdr_compatibility_flag;
    unsigned int(4)         reserved=0;
    unsigned int(32)        average_frame_luminance_level;
    unsigned int(32)        max_frame_pixel_luminance;
}
```

FIG. 16

```
aligned(8) class TrackHeaderBox extends FullBox('tkhd', version, flags) {
  if(version==1) {
    unsigned int(64)         creation_time;
    unsigned int(64)         modification_time;
    unsigned int(32)         track_ID;
    const unsigned int(32)   reserved = 0;
    unsigned int(64)         duration;
  } else { // version==0
    unsigned int(32)         creation_time;
    unsigned int(32)         modification_time;
    unsigned int(32)         track_ID;
    const unsigned int(32)   reserved = 0;
    unsigned int(32)         duration;
  }
  const unsigned int(32)[2]  reserved = 0;
  template int(16)           layer = 0;
  template int(16)           alternate_group = 0;
  template int(16)           volume = {if track_is_audio 0x0100 else 0};
  const unsigned int(16)     reserved = 0;
  template int(32)[9]        matrix=
   { 0x00010000,0,0,0,0x00010000,0,0,0,0x40000000 };// unity matrix
  unsigned int(32)           width;
  unsigned int(32)           height;
  unsigned int(1)            hdr_flag;
  unsigned int(7)            reserved=0;
  if(hdr_flag == 1) {
    unsigned int(1)          hdr_type_transition_flag;
    unsigned int(1)          hdr_sdr_transition_flag;
    unsigned int(1)          sdr_hdr_transition_flag;
    unsigned int(1)          sdr_compatibility_flag;
    unsigned int(4)          reserved=0;
  }
}
```
~t16010

```
aligned(8) class TrackHeaderBox extends FullBox('tkhd', version, flags) {
  if(version==1) {
    unsigned int(64)         creation_time;
    unsigned int(64)         modification_time;
    unsigned int(32)         track_ID;
    const unsigned int(32)   reserved = 0;
    unsigned int(64)         duration;
  } else { // version==0
    unsigned int(32)         creation_time;
    unsigned int(32)         modification_time;
    unsigned int(32)         track_ID;
    const unsigned int(32)   reserved = 0;
    unsigned int(32)         duration;
  }
  const unsigned int(32)[2]  reserved = 0;
  template int(16)           layer = 0;
  template int(16)           alternate_group = 0;
  template int(16)           volume = {if track_is_audio 0x0100 else 0};
  const unsigned int(16)     reserved = 0;
  template int(32)[9]        matrix=
   { 0x00010000,0,0,0,0x00010000,0,0,0,0x40000000 };// unity matrix
  unsigned int(32)           width;
  unsigned int(32)           height;
  unsigned int(1)            hdr_flag;
  unsigned int(7)            reserved=0;
  if(hdr_flag == 1) {
    HDRConfigurationBox      hdr_config;
  }
}
```
~t16020

FIG. 17

```
aligned(8) class VideoMediaHeaderBox extends FullBox('vmhd', version = 0, 1) {
    template unsigned int(16)      graphicsmode = 0;
    // copy, see below
    template unsigned int(16)[3]   opcolor = {0, 0, 0};
    unsigned int(1)                hdr_flag;
    unsigned int(7)                reserved=0;
    if(hdr_flag == 1){
        unsigned int(1)            hdr_type_transition_flag;
        unsigned int(1)            hdr_sdr_transition_flag;
        unsigned int(1)            sdr_hdr_transition_flag;
        unsigned int(1)            sdr_compatibility_flag;
        unsigned int(4)            reserved=0;
    }
}
```
t17010

```
aligned(8) class VideoMediaHeaderBox extends FullBox('vmhd', version = 0, 1) {
    template unsigned int(16)      graphicsmode = 0;
    // copy, see below
    template unsigned int(16)[3]   opcolor = {0, 0, 0};
    unsigned int(1)                hdr_flag;
    unsigned int(7)                reserved=0;
    if(hdr_flag == 1){
        HDRConfigurationBox        hdr_config;
    }
}
```
t17020

FIG. 18

```
aligned(8) class TrackExtendsBox extends FullBox('trex', 0, 0){
    unsigned int(32)           track_ID;
    unsigned int(32)           default_sample_description_index;
    unsigned int(32)           default_sample_duration;
    unsigned int(32)           default_sample_size;
    unsigned int(32)           default_sample_flags;
    unsigned int(1)            default_hdr_flag;
    unsigned int(1)            default_sample_hdr_flag;
    unsigned int(6)            reserved=0;
    if(default_hdr_flag == 1){
        HDRConfigurationBox    default_hdr_config;
    }
    if(default_sample_hdr_flag == 1){
        HDRConfigurationBox    default_sample_hdr_config;
    }
}
```

FIG. 19 t19010
```
aligned(8) class TrackFragmentHeaderBox extends FullBox('tfhd', 0, tf_flags){
    unsigned int(32)            track_ID;
    unsigned int(1)             hdr_flag;
    unsigned int(7)             reserved=0;
    if(hdr_flag == 1){
        unsigned int(1)         hdr_type_transition_flag;
        unsigned int(1)         hdr_sdr_transition_flag;
        unsigned int(1)         sdr_hdr_transition_flag;
        unsigned int(1)         sdr_compatibility_flag;
        unsigned int(4)         reserved=0;
    }
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
}
``` t19020
```
aligned(8) class TrackFragmentHeaderBox extends FullBox('tfhd', 0, tf_flags){
    unsigned int(32)            track_ID;
    unsigned int(1)             hdr_flag;
    unsigned int(7)             reserved=0;
    if(hdr_flag == 1){
        HDRConfigurationBox     hdr_config
    }
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
}
``` t19030
```
aligned(8) class TrackFragmentHeaderBox extends FullBox('tfhd', 0, tf_flags){
    unsigned int(32)            track_ID;
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
    HDRConfigurationBox         default_sample_hdr_config;
}
```

FIG. 20 t20010

```
aligned(8) class TrackRunBox extends FullBox('trun', version, tr_flags) {
    unsigned int(32)    sample_count;
    unsigned int(1)     hdr_flag;
    unsigned int(7)     reserved=0;
    if(hdr_flag == 1){
        unsigned int()  hdr_type_transition_flag;
        unsigned int()  hdr_sdr_transition_flag;
        unsigned int()  sdr_hdr_transition_flag;
        unsigned int()  sdr_compatibility_flag;
        unsigned int(4) reserved=0;
    }
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if (version == 0)
        {
            unsigned int(32)    sample_composition_time_offset;
        }else {
            signed int(32)      sample_composition_time_offset;
        }
    }[ sample_count ]
}
``` t20020

```
aligned(8) class TrackRunBox extends FullBox('trun', version, tr_flags) {
    unsigned int(32)    sample_count;
    unsigned int(1)     hdr_flag;
    unsigned int(7)     reserved=0;
    if(hdr_flag == 1){
        HDRConfigurationBox hdr_config;
    }
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if (version == 0)
        {
            unsigned int(32)    sample_composition_time_offset;
        }else {
            signed int(32)      sample_composition_time_offset;
        }
    }[ sample_count ]
}
``` t20030

```
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    HDRConfigurationBox hdr_config;
    // all fields in the following array are optional
    {
        unsigned int(32)    sample_duration;
        unsigned int(32)    sample_size;
        unsigned int(32)    sample_flags;
        if (version == 0)
        {
            unsigned int(32)    sample_composition_time_offset;
        }else {
            signed int(32)      sample_composition_time_offset;
        }
    }[ sample_count ]
}
``` t20040

```
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if (version == 0)
        {
            unsigned int(32)    sample_composition_time_offset;
        }else {
            signed int(32)      sample_composition_time_offset;
        }
        HDRConfigurationBox sample_hdr_config;
    }[ sample_count ]
}
```

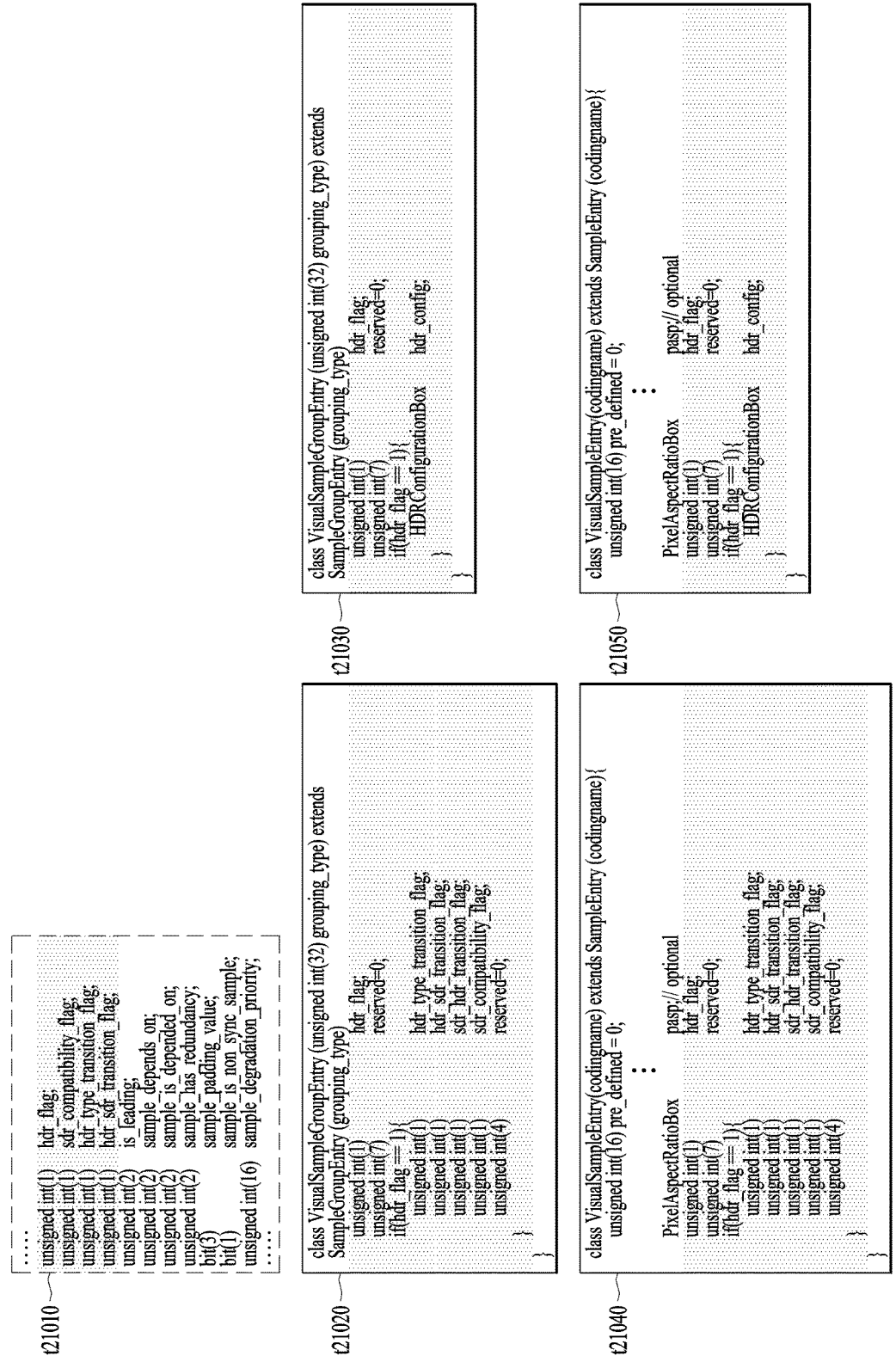

FIG. 22 t22010
```
class HEVCSampleEntry() extends VisualSampleEntry ('hvc1' or 'hev1'){
    HEVCConfigurationBox config;
    HDRConfigurationBox hdr_config;//optional
    MPEG4BitRateBox (); // optional
    MPEG4ExtensionDescriptorsBox (); // optional
    extra_boxes boxes; // optional
}
``` t22020
```
class HEVCConfigurationBox extends Box('hvcC') {
    HEVCDecoderConfigurationRecord() HEVCConfig;
    HDRConfigurationBox hdr_config;//optional
}
``` t22030
```
aligned(8) class HEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(3) reserved = '111'b;
    bit(1)       hdr_flag;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    if(hdr_flag ==1){
        HDRConfiguration       hdr_config;
    }
}
```

FIG. 23 t23010
```
class HDRInformationSEIBox extends Box('hisb', size)
{
    unsigned int(8*size-64)        hdrinfosei;
}
``` t23020
```
class VisualSampleEntry(codingname) extends SampleEntry (codingname){
    unsigned int(16) pre_defined = 0;
    const unsigned int(16) reserved = 0;
    unsigned int(32)[3]            pre_defined = 0;
    unsigned int(16)               width;
    unsigned int(16)               height;
    template unsigned int(32)      horizresolution = 0x00480000; // 72 dpi
    template unsigned int(32)      vertresolution  = 0x00480000; // 72 dpi
    const unsigned int(32)         reserved = 0;
    template unsigned int(16)      frame_count = 1;
    string[32]    compressorname;
    template unsigned int(16)      depth = 0x0018;
     int(16)         pre_defined = -1;
    // other boxes from derived specifications
    CleanApertureBox               clap;// optional
    PixelAspectRatioBox            pasp;// optional
    HDRInformationSEIBox           hdr_sei; // optional
}
``` t23030
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    HDRInformationSEIBox        hdr_sei; // optional
}
``` t23040
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    HDRInformationSEIBox hdr_sei; // optional
    extra_boxes boxes; // optional
}
```

FIG. 25

```
aligned(8) class CGConfigurationBox extends FullBox('cgcf', version=0, 0) {
    CGConfiguration         cg_config;
}
```
t25010

```
aligned(8) class CGConfiguration (){
    unsigned int(8)         color_gamut_type;
    unsigned int(1)         color_space_transition_flag;
    unsigned int(1)         wcg_scg_transition_flag;
    unsigned int(1)         scg_wcg_transition_flag;
    unsigned int(1)         scg_compatibility_flag;
    unsigned int(1)         color_primary_flag;
    unsigned int(4)         reserved=0;
    if(color_primary_flag ==1)
    {
        unsigned int(32)    color_primaryRx;
        unsigned int(32)    color_primaryRy;
        unsigned int(32)    color_primaryGx;
        unsigned int(32)    color_primaryGy;
        unsigned int(32)    color_primaryBx;
        unsigned int(32)    color_primaryBy;
        unsigned int(32)    color_whitePx;
        unsigned int(32)    color_whitePy;
    }
}
``` t25020

| color_gamut_type Value | Meaning |
|---|---|
| 0 | reserved |
| 1 | Rec. ITU-R BT.709-5, Rec. ITU-R BT.1361 conventional colour gamut system and extended colour gamut system, IEC 61966-2-1 (sRGB or sYCC), IEC 61966-2-4, Society of Motion Picture and Television Engineers RP 177 (1993) |
| 2 | unspecified |
| 3 | Reserved for future use |
| 4 | Rec. ITU-R BT.470-6 System M (historical), United States National Television System Committee 1953 Recommendation for transmission standards for colour television United States Federal Communications Commission Title 47 Code of Federal Regulations (2003) 73.682 (a) |
| 5 | Rec. ITU-R BT.470-6 System B, G (historical), Rec. ITU-R BT.601-6 625, Rec. ITU-R BT.1358 625 Rec. ITU-R BT.1700 625 PAL and 625 SECAM |
| 6 | Rec. ITU-R BT.601-6 525, Rec. ITU-R BT.1358 525, Rec. ITU-R BT.1700 NTSC Society of Motion Picture and Television Engineers 170M (2004) |
| 7 | Society of Motion Picture and Television Engineers 240M (1999) |
| 8 | Generic film (colour filters using Illuminant C) |
| 9 | Rec. ITU-R BT.2020 |
| 10-255 | Reserved for future use |

FIG. 26 t26010

```
aligned(8) class TrackHeaderBox extends FullBox('tkhd', version, flags){
    if (version==1) {
        unsigned int(64)        creation_time;
        unsigned int(64)        modification_time;
        unsigned int(32)        track_ID;
        const unsigned int(32)  reserved = 0;
        unsigned int(64)        duration;
    } else { // version==0
        unsigned int(32)        creation_time;
        unsigned int(32)        modification_time;
        unsigned int(32)        track_ID;
        const unsigned int(32)  reserved = 0;
        unsigned int(32)        duration;
    }
    const unsigned int(32)[2]   reserved = 0;
    template int(16)            layer = 0;
    template int(16)            alternate_group = 0;
    template int(16)            volume = {if track_is_audio 0x0100 else 0};
    const unsigned int(16)      reserved = 0;
    template int(32)[9]         matrix=
        { 0x00010000,0,0,0,0x00010000,0,0,0,0x40000000 };// unity matrix
    unsigned int(32)            width;
    unsigned int(32)            height;
    unsigned int(1)             container_wcg_flag;
    unsigned int(1)             content_wcg_flag;
    unsigned int(5)             reserved=0;
    if(container_wcg_flag == 1){
        CGConfigurationBox      container_cg_config;
                                sdr_hdr_transition_flag;
    }
    if(content_wcg_flag == 1){
        CGConfigurationBox      content_cg_config;
    }
}
``` t26020

```
aligned(8) class TrackHeaderBox extends FullBox('tkhd', version, flags){
    if (version==1) {
        unsigned int(64)        creation_time;
        unsigned int(64)        modification_time;
        unsigned int(32)        track_ID;
        const unsigned int(32)  reserved = 0;
        unsigned int(64)        duration;
    } else { // version==0
        unsigned int(32)        creation_time;
        unsigned int(32)        modification_time;
        unsigned int(32)        track_ID;
        const unsigned int(32)  reserved = 0;
        unsigned int(32)        duration;
    }
    const unsigned int(32)[2]   reserved = 0;
    template int(16)            layer = 0;
    template int(16)            alternate_group = 0;
    template int(16)            volume = {if track_is_audio 0x0100 else 0};
    const unsigned int(16)      reserved = 0;
    template int(32)[9]         matrix=
        { 0x00010000,0,0,0,0x00010000,0,0,0,0x40000000 };// unity matrix
    unsigned int(32)            width;
    unsigned int(32)            height;
    unsigned int(1)             container_wcg_flag;
    unsigned int(1)             content_wcg_flag;
    unsigned int(5)             reserved=0;
    if(container_wcg_flag == 1){
        unsigned int(1)         container_color_space_transition_flag;
        unsigned int(1)         container_wcg_scg_transition_flag;
        unsigned int(1)         container_scg_wcg_transition_flag;
        unsigned int(1)         container_scg_compatibility_flag;
        unsigned int(4)         reserved=0;
    }
    if(content_wcg_flag == 1){
        unsigned int(1)         content_color_space_transition_flag;
        unsigned int(1)         content_wcg_scg_transition_flag;
        unsigned int(1)         content_scg_wcg_transition_flag;
        unsigned int(1)         content_scg_compatibility_flag;
        unsigned int(4)         reserved=0;
    }
}
```

FIG. 27

```
t27010  aligned(8) class VideoMediaHeaderBox extends FullBox('vmhd', version = 0, 1) {
        template unsigned int(16)        graphicsmode = 0;
        // copy, see below
        template unsigned int(16)[3]     opcolor = {0, 0, 0};
        unsigned int(1)     container_wcg_flag;
        unsigned int(1)     content_wcg_flag;
        unsigned int(5)     reserved=0;
        if(container_wcg_flag == 1){
        unsigned int(1)     container_color_space_transition_flag;
        unsigned int(1)     container_wcg_scg_transition_flag;
        unsigned int(1)     container_scg_wcg_transition_flag;
        unsigned int(1)     container_scg_compatibility_flag;
        unsigned int(4)     reserved=0;
        }
        if(content_wcg_flag == 1){
        unsigned int(1)     content_color_space_transition_flag;
        unsigned int(1)     content_wcg_scg_transition_flag;
        unsigned int(1)     content_scg_wcg_transition_flag;
        unsigned int(1)     content_scg_compatibility_flag;
        unsigned int(4)     reserved=0;
        }
        }
```

```
t27020  aligned(8) class VideoMediaHeaderBox extends FullBox('vmhd', version = 0, 1) {
        template unsigned int(16)        graphicsmode = 0;
        // copy, see below
            template unsigned int(16)[3]     opcolor = {0, 0, 0};
            unsigned int(1)         container_wcg_flag;
            unsigned int(1)         content_wcg_flag;
            unsigned int(5)         reserved=0;
            if(container_wcg_flag == 1){
                CGConfigurationBox      container_cg_config;
            }
            if(content_wcg_flag == 1){
                CGConfigurationBox      content_cg_config;
            }
        }
```

FIG. 28

```
aligned(8) class TrackExtendsBox extends FullBox('trex', 0, 0){
    unsigned int(32)           track_ID;
    unsigned int(32)           default_sample_description_index;
    unsigned int(32)           default_sample_duration;
    unsigned int(32)           default_sample_size;
    unsigned int(32)           default_sample_flags;
    unsigned int(1)            default_container_wcg_flag;
    unsigned int(1)            default_content_wcg_flag;
    unsigned int(5)            reserved=0;
    if(default_container_wcg_flag == 1){
        CGConfigurationBox     default_container_cg_config;
    }
    if(default_content_wcg_flag == 1){
        CGConfigurationBox     default_content_cg_config;
    }
}
```

FIG. 29 t29010
```
aligned(8) class TrackFragmentHeaderBox extends FullBox('tfhd', 0, tf_flags){
    unsigned int(32)         track_ID;
    unsigned int(1)          container_wcg_flag;
    unsigned int(1)          content_wcg_flag;
    unsigned int(5)          reserved=0;
    if(container_wcg_flag == 1){
        CGConfigurationBox   container_cg_config;
    }
    if(content_wcg_flag == 1){
        CGConfigurationBox   content_cg_config;
    }
    // all the following are optional fields
    unsigned int(64)         base_data_offset;
    unsigned int(32)         sample_description_index;
    unsigned int(32)         default_sample_duration;
    unsigned int(32)         default_sample_size;
    unsigned int(32)         default_sample_flags;
}
``` t29020
```
aligned(8) class TrackFragmentHeaderBox extends FullBox('tfhd', 0, tf_flags){
    unsigned int(32)         track_ID;
    // all the following are optional fields
    unsigned int(64)         base_data_offset;
    unsigned int(32)         sample_description_index;
    unsigned int(32)         default_sample_duration;
    unsigned int(32)         default_sample_size;
    unsigned int(32)         default_sample_flags;
    CGConfigurationBox       default_container_cg_config;
    CGConfigurationBox       default_content_cg_config;
}
```

FIG. 30 t30010

```
aligned(8) class TrackRunBox extends FullBox('trun', version, tr_flags) {
    unsigned int(32)      sample_count;
    unsigned int(1)       container_wcg_flag;
    unsigned int(1)       content_wcg_flag;
    unsigned int(5)       reserved=0;
    if(container_wcg_flag == 1){
        CGConfigurationBox    container_cg_config;
    }
    if(content_wcg_flag == 1){
        CGConfigurationBox    content_cg_config;
    }
    // the following are optional fields
    signed int(32)        data_offset;
    unsigned int(32)      first_sample_flags;
    // all fields in the following array are optional
    {
        unsigned int(32)  sample_duration;
        unsigned int(32)  sample_size;
        unsigned int(32)  sample_flags;
        if (version == 0)
        {
            unsigned int(32)  sample_composition_time_offset;
        }else {
            signed int(32)    sample_composition_time_offset;
            reserved=0;
        }
    }[ sample_count ]
}
``` t30020

```
aligned(8) class TrackRunBox extends FullBox('trun', version, tr_flags) {
    unsigned int(32)      sample_count;
    unsigned int(1)       container_wcg_flag;
    unsigned int(1)       content_wcg_flag;
    unsigned int(5)       reserved=0;
    if(container_wcg_flag == 1){
        unsigned int(1)   container_color_space_transition_flag;
        unsigned int(1)   container_wcg_scg_transition_flag;
        unsigned int(1)   container_scg_wcg_transition_flag;
        unsigned int(1)   container_scg_compatibility_flag;
        unsigned int(4)   reserved=0;
    }
    if(content_wcg_flag == 1){
        unsigned int(1)   content_color_space_transition_flag;
        unsigned int(1)   content_wcg_scg_transition_flag;
        unsigned int(1)   content_scg_wcg_transition_flag;
        unsigned int(1)   content_scg_compatibility_flag;
        unsigned int(4)   reserved=0;
    }
    // the following are optional fields
    signed int(32)        data_offset;
    unsigned int(32)      first_sample_flags;
    // all fields in the following array are optional
    {
        unsigned int(32)  sample_duration;
        unsigned int(32)  sample_size;
        unsigned int(32)  sample_flags;
        if (version == 0)
        {
            unsigned int(32)  sample_composition_time_offset;
        }else {
            signed int(32)    sample_composition_time_offset;
        }
    }[ sample_count ]
}
```

FIG. 31 t31010
```
aligned(8) class TrackFragmentHeaderBox extends FullBox('trun', version, tr_flags) {
    unsigned int(32)          sample_count;
    // the following are optional fields
    signed int(32)            data_offset;
    unsigned int(32)          first_sample_flags;
    CGConfigurationBox        container_cg_config;
    CGConfigurationBox        content_cg_config;
    // all fields in the following array are optional
    {
        unsigned int(32)      sample_duration;
        unsigned int(32)      sample_size;
        unsigned int(32)      sample_flags;
        if (version == 0)
        {
            unsigned int(32)  sample_composition_time_offset;
        } else {
            signed int(32)    sample_composition_time_offset;
        }
    }[ sample_count ]
}
``` t31020
```
aligned(8) class TrackFragmentHeaderBox extends FullBox('trun', version, tr_flags) {
    unsigned int(32)          sample_count;
    // the following are optional fields
    signed int(32)            data_offset;
    unsigned int(32)          first_sample_flags;
    // all fields in the following array are optional
    {
        unsigned int(32)      sample_duration;
        unsigned int(32)      sample_size;
        unsigned int(32)      sample_flags;
        if (version == 0)
        {
            unsigned int(32)  sample_composition_time_offset;
        } else {
            signed int(32)    sample_composition_time_offset;
        }
        CGConfigurationBox    container_cg_config;
        CGConfigurationBox    content_cg_config;
    }[ sample_count ]
}
```

FIG. 32 t32010
```
.....
unsigned int(1)      container_wcg_flag;
unsigned int(1)      container_scg_compatibility_flag;
unsigned int(1)      content_wcg_flag;
unsigned int(1)      content_scg_compatibility_flag;
unsigned int(2)      is_leading;
unsigned int(2)      sample_depends_on;
unsigned int(2)      sample_is_depended_on;
unsigned int(2)      sample_has_redundancy;
bit(3)               sample_padding_value;
bit(1)               sample_is_non_sync_sample;
unsigned int(16)     sample_degradation_priority;
.....
``` t32020
```
class VisualSampleGroupEntry (unsigned int(32) grouping_type) extends
SampleGroupEntry (grouping_type)
    unsigned int(1)      container_wcg_flag;
    unsigned int(1)      content_wcg_flag;
    unsigned int(5)      reserved=0;
    if(container_wcg_flag == 1){
        unsigned int(1)      container_color_space_transition_flag;
        unsigned int(1)      container_wcg_scg_transition_flag;
        unsigned int(1)      container_scg_wcg_transition_flag;
        unsigned int(1)      container_scg_compatibility_flag;
        unsigned int(4)      reserved=0;
    }
    if(content_wcg_flag == 1){
        unsigned int(1)      content_color_space_transition_flag;
        unsigned int(1)      content_wcg_scg_transition_flag;
        unsigned int(1)      content_scg_wcg_transition_flag;
        unsigned int(1)      content_scg_compatibility_flag;
        unsigned int(4)      reserved=0;
    }
}
``` t32030
```
class VisualSampleGroupEntry (unsigned int(32) grouping_type) extends
SampleGroupEntry (grouping_type)
    unsigned int(1)      container_wcg_flag;
    unsigned int(1)      content_wcg_flag;
    unsigned int(5)      reserved=0;
    if(container_wcg_flag == 1){
        CGConfigurationBox   container_cg_config;
    }
    if(content_wcg_flag == 1){
        CGConfigurationBox   content_cg_config;
    }
}
```

FIG. 33 t33010

```
class VisualSampleEntry(codingname) extends SampleEntry {
    unsigned int(16) pre_defined = 0;
    const unsigned int(16) reserved = 0;
    unsigned int(32)[3]           pre_defined = 0;
    unsigned int(16)              width;
    unsigned int(16)              height;
    template unsigned int(32)     horizresolution = 0x00480000; // 72 dpi
    template unsigned int(32)     vertresolution = 0x00480000; // 72 dpi
    const unsigned int(32)        reserved = 0;
    template unsigned int(16)     frame_count = 1;
    string[32]                    compressorname;
    template unsigned int(16)     depth = 0x0018;
    int(16)           pre_defined = -1;
    // other boxes from derived specifications
    CleanApertureBox              clap;// optional
    PixelAspectRatioBox           pasp;// optional
    unsigned int(1)               container_wcg_flag;
    unsigned int(1)               content_wcg_flag;
    unsigned int(5)               reserved=0;
    if(container_wcg_flag == 1){
        unsigned int(1)           container_color_space_transition_flag;
        unsigned int(1)           container_wcg_scg_transition_flag;
        unsigned int(1)           container_scg_wcg_transition_flag;
        unsigned int(1)           container_scg_compatibility_flag;
        unsigned int(4)           reserved=0;
    }
    if(content_wcg_flag == 1){
        unsigned int(1)           content_color_space_transition_flag;
        unsigned int(1)           content_wcg_scg_transition_flag;
        unsigned int(1)           content_scg_wcg_transition_flag;
        unsigned int(1)           content_scg_compatibility_flag;
        unsigned int(4)           reserved=0;
    }
}
``` t33020

```
class VisualSampleEntry(codingname) extends SampleEntry {
    unsigned int(16) pre_defined = 0;
    const unsigned int(16) reserved = 0;
    unsigned int(32)[3]           pre_defined = 0;
    unsigned int(16)              width;
    unsigned int(16)              height;
    template unsigned int(32)     horizresolution = 0x00480000; // 72 dpi
    template unsigned int(32)     vertresolution = 0x00480000; // 72 dpi
    const unsigned int(32)        reserved = 0;
    template unsigned int(16)     frame_count = 1;
    string[32]                    compressorname;
    template unsigned int(16)     depth = 0x0018;
    int(16)           pre_defined = -1;
    // other boxes from derived specifications
    CleanApertureBox              clap;// optional
    PixelAspectRatioBox           pasp;// optional
    unsigned int(1)               container_wcg_flag;
    unsigned int(1)               content_wcg_flag;
    unsigned int(5)               reserved=0;
    if(container_wcg_flag == 1){
        CGConfigurationBox        container_cg_config;
    }
    if(content_wcg_flag == 1){
        CGConfigurationBox        content_cg_config;
    }
}
```

FIG. 34 t34010
```
class HEVCSampleEntry() extends VisualSampleEntry ('hvc1' or 'hev1'){
  HEVCConfigurationBox config;
  CGConfigurationBox container_cg_config; // optional
  CGConfigurationBox content_cg_config; // optional
  MPEG4BitRateBox (); // optional
  MPEG4ExtensionDescriptorsBox (); // optional
  extra_boxes boxes; // optional
}
``` t34020
```
class HEVCConfigurationBox extends Box('hvcC') {
  HEVCDecoderConfigurationRecord() HEVCConfig;
    unsigned int(1)    container_wcg_flag;
    unsigned int(1)    content_wcg_flag;
    unsigned int(5)    reserved=0;
    if(container_wcg_flag == 1){
      CGConfigurationBox   container_cg_config;
    }
    if(content_wcg_flag == 1){
      CGConfigurationBox   content_cg_config;
    }
}
``` t34030
```
aligned(8) class HEVCDecoderConfigurationRecord {
  unsigned int(8) configurationVersion = 1;
  unsigned int(2) general_profile_space;
  unsigned int(1) general_tier_flag;
  unsigned int(5) general_profile_idc;
  unsigned int(32) general_profile_compatibility_flags;
  unsigned int(48) general_constraint_indicator_flags;
  unsigned int(8) general_level_idc;
  bit(3) reserved = '111'b;
  bit(2) reserved = '11'b;
  unsigned int(1)            container_cg_flag;
  unsigned int(1)            content_cg_flag;
  unsigned int(12) min_spatial_segmentation_idc;
  bit(6) reserved = '111111'b;
  unsigned int(2) parallelismType;
  bit(6) reserved = '111111'b;
  unsigned int(2) chromaFormat;
  bit(5) reserved = '11111'b;
  unsigned int(3) bitDepthLumaMinus8;
  bit(5) reserved = '11111'b;
  unsigned int(3) bitDepthChromaMinus8;
  bit(16) avgFrameRate;
  bit(2) constantFrameRate;
  bit(3) numTemporalLayers;
  bit(1) temporalIdNested;
  unsigned int(2) lengthSizeMinusOne;
  unsigned int(8) numOfArrays;
  for (j=0; j < numOfArrays; j++) {
    bit(1) array_completeness;
    unsigned int(1) reserved = 0;
    unsigned int(6) NAL_unit_type;
    unsigned int(16) numNalus;
    for (i=0; i< numNalus; i++) {
      unsigned int(16) nalUnitLength;
      bit(8*nalUnitLength) nalUnit;
    }
  }
  if(container_cg_flag == 1){
    CGConfigurationBox    container_cg_config;
  }
  if(content_cg_flag == 1){
    CGConfigurationBox    content_cg_config;
  }
}
```

FIG. 35 t35010
```
class CGInformationSEIBox extends Box('cisb', size)
{
    unsigned int(8*size-64)      cginfosei;
}
``` t35020
```
class VisualSampleEntry(codingname) extends SampleEntry (codingname){
    unsigned int(16) pre_defined = 0;
    const unsigned int(16) reserved = 0;
    unsigned int(32)[3]      pre_defined = 0;
    unsigned int(16)         width;
    unsigned int(16)         height;
    template unsigned int(32)   horizresolution = 0x00480000; // 72 dpi
    template unsigned int(32)   vertresolution  = 0x00480000; // 72 dpi
    const unsigned int(32)      reserved = 0;
    template unsigned int(16)   frame_count = 1;
    string[32]       compressorname;
    template unsigned int(16)   depth = 0x0018;
    int(16)          pre_defined = -1;
    // other boxes from derived specifications
    CleanApertureBox           clap;// optional
    PixelAspectRatioBox        pasp;// optional
    CGInformationSEIBox        cg_sei; // optional
}
``` t35030
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    CGInformationSEIBox      cg_sei; // optional
}
``` t35040
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    CGInformationSEIBox      cg_sei; // optional
    extra_boxes boxes; // optional
}
```

TRANSMISSION DEVICE FOR PROCESSING VIDEO DATA RELATED TO HDR/SDR AND METHOD FOR CONTROLLING THE SAME

CROSS REFERENCE TO RELATED APPLICATIONS

This application is the National Phase of PCT International Application No. PCT/KR2016/004820, filed on May 9, 2016, which claims priority under 35 U.S.C. 119(e) to U.S. Provisional Application No. 62/158,494, filed on May 7, 2015 and No. 62/159,911, filed on May 11, 2015, all of which are hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention proposes a method of defining, storing, and transmitting high dynamic range (HDR) information and wide color gamut (WCG) information in a media file.

A method according to the present invention may effectively store and transmit HDR information and WCG information. The method according to the present invention proposes an effective signaling method when HDR information and WCG information of a video sample are changed in units of a video sample or a track fragment. The method according to the present invention proposes effective signaling for each level of HDR information and WCG information. The method according to the present invention may provide excellent compatibility in various storing and transmitting systems using a corresponding media file format.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through an MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a writing operation of a time interleaver according to an embodiment of the present invention;

FIG. 15 is a diagram showing a HDR configuration box for providing HDR information according to an embodiment of the present invention;

FIG. 16 is a diagram showing a method of defining HDR information in a tkhd box according to an embodiment of the present invention;

FIG. 17 is a diagram showing a method of defining HDR information in a vmhd box according to an embodiment of the present invention;

FIG. 18 is a diagram showing a method of defining HDR information in a trex box according to an embodiment of the present invention;

FIG. 19 is a diagram showing a method of defining HDR information in a tfhd box according to an embodiment of the present invention;

FIG. 20 is a diagram showing a method of defining HDR information in a trun box according to an embodiment of the present invention;

FIG. 21 is a diagram showing a method of defining HDR information in various flags, sample group entry, or sample entry according to an embodiment of the present invention;

FIG. 22 is a diagram showing a method of defining HDR information in a HEVC sample entry, a HEVC configuration box, or HEVC decoder configuration record, according to an embodiment of the present invention;

FIG. 23 is a diagram showing a method of defining a HDR information SEI box and storing/transmitting HDR information according to an embodiment of the present invention;

FIG. 25 is a diagram showing a CG configuration box for providing color gamut information according to an embodiment of the present invention;

FIG. 26 is a diagram showing a method of defining color gamut information in a tkhd box according to an embodiment of the present invention;

FIG. 27 is a diagram showing a method of defining color gamut information in a vmhd box according to an embodiment of the present invention;

FIG. 28 is a diagram showing a method of defining color gamut information in a trex box according to an embodiment of the present invention;

FIG. 29 is a diagram showing a method of defining color gamut information in a tfhd box according to an embodiment of the present invention;

FIG. 30 is a diagram showing a method of defining color gamut information in a trun box according to an embodiment of the present invention;

FIG. 31 is a diagram showing a method of defining color gamut information in a trun box according to another embodiment of the present invention;

FIG. 32 is a diagram showing a method of defining color gamut information in various flags, sample group entry, or sample entry according to an embodiment of the present invention;

FIG. 33 is a diagram showing a method of defining color gamut information in various flags, sample group entry, or sample entry according to another embodiment of the present invention;

FIG. 34 is a diagram showing a method of defining color gamut information in a HEVC sample entry, a HEVC configuration box, or HEVC decoder configuration record according to an embodiment of the present invention;

FIG. 35 is a diagram showing a method of defining a CG information SEI box and storing/transmitting color gamut information according to an embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
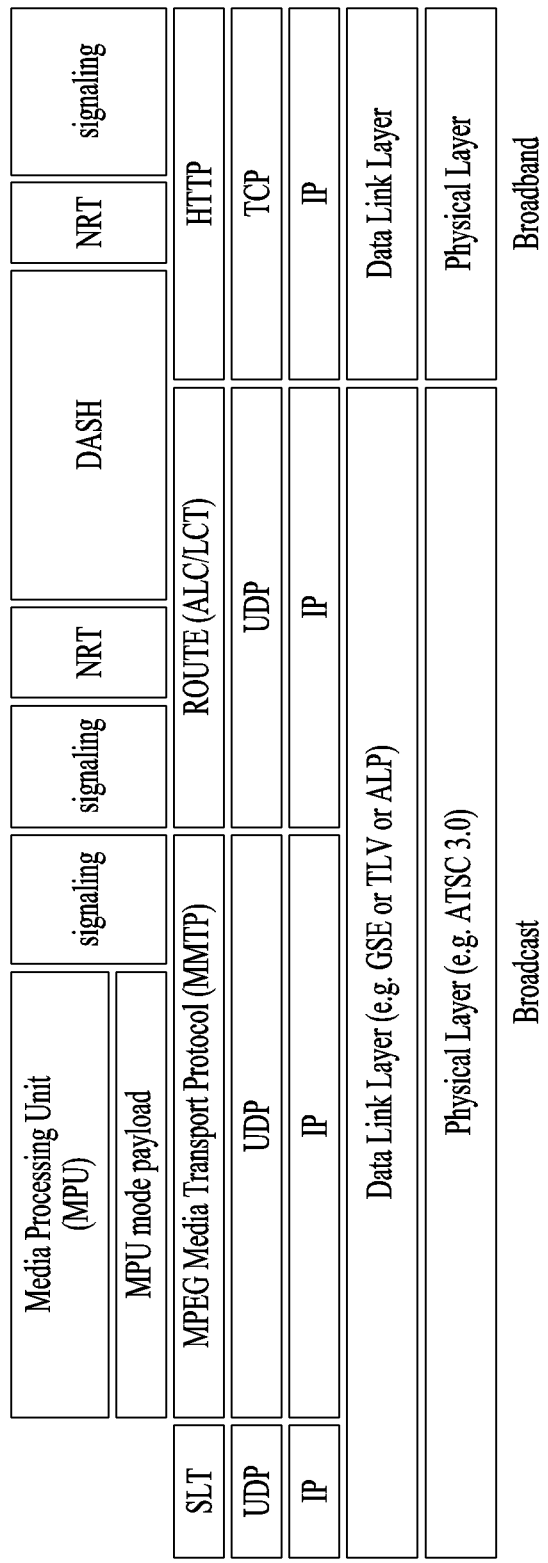
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
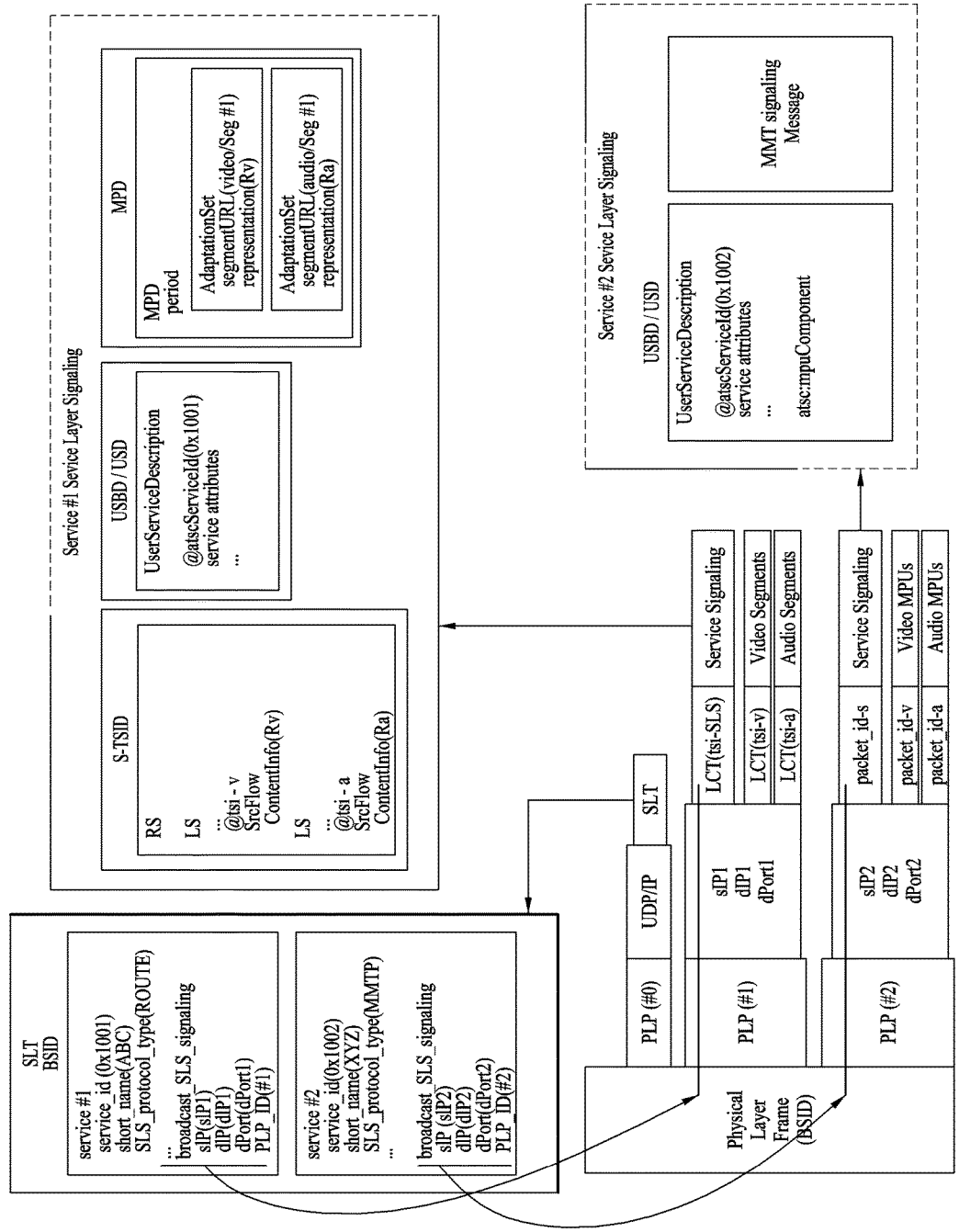
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MM IP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @uriType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmt- PackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquring the signaling information, the receiver may combine the information to acquire mapping of service-IP information-context information-PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
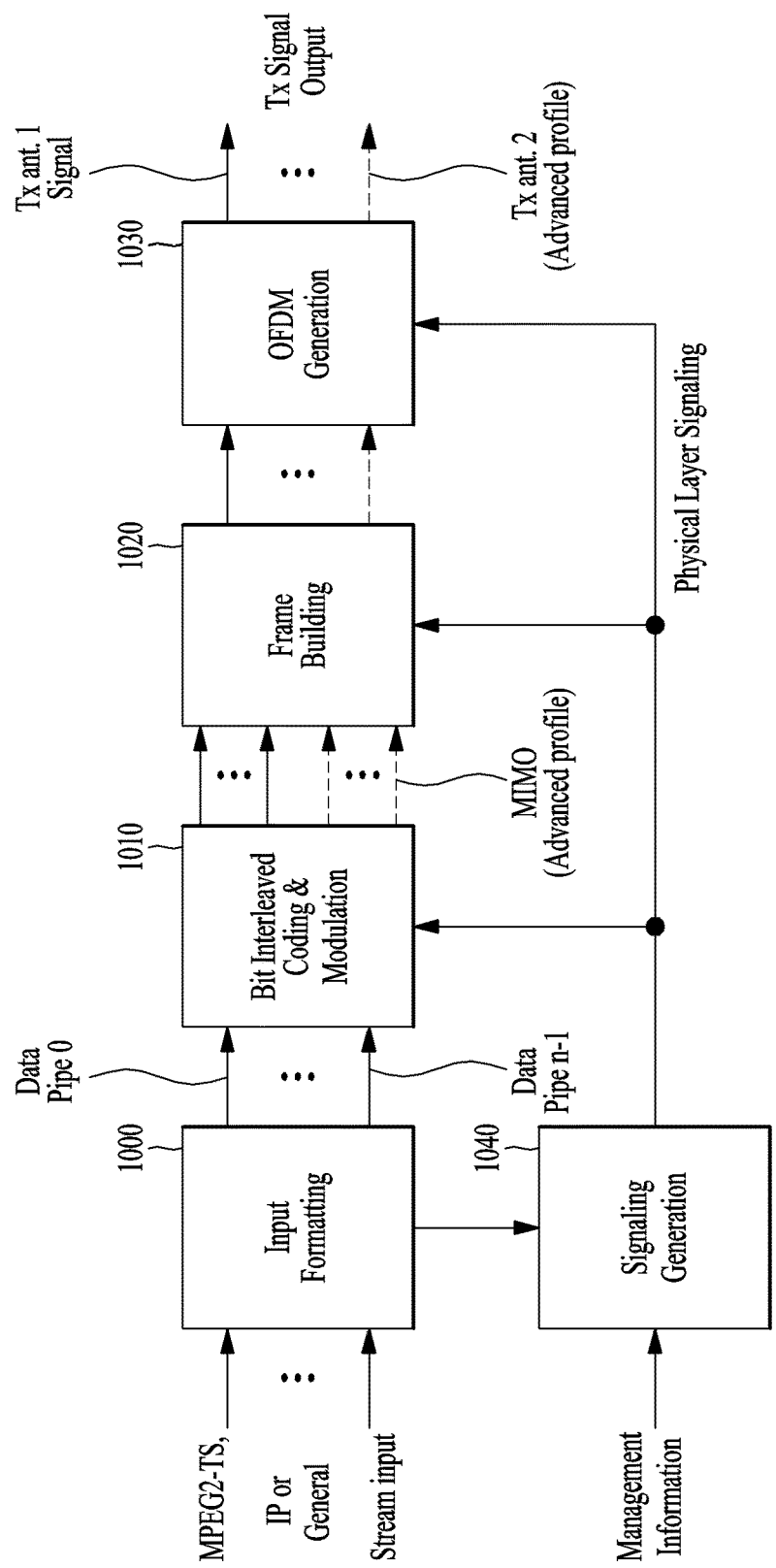
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol l of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
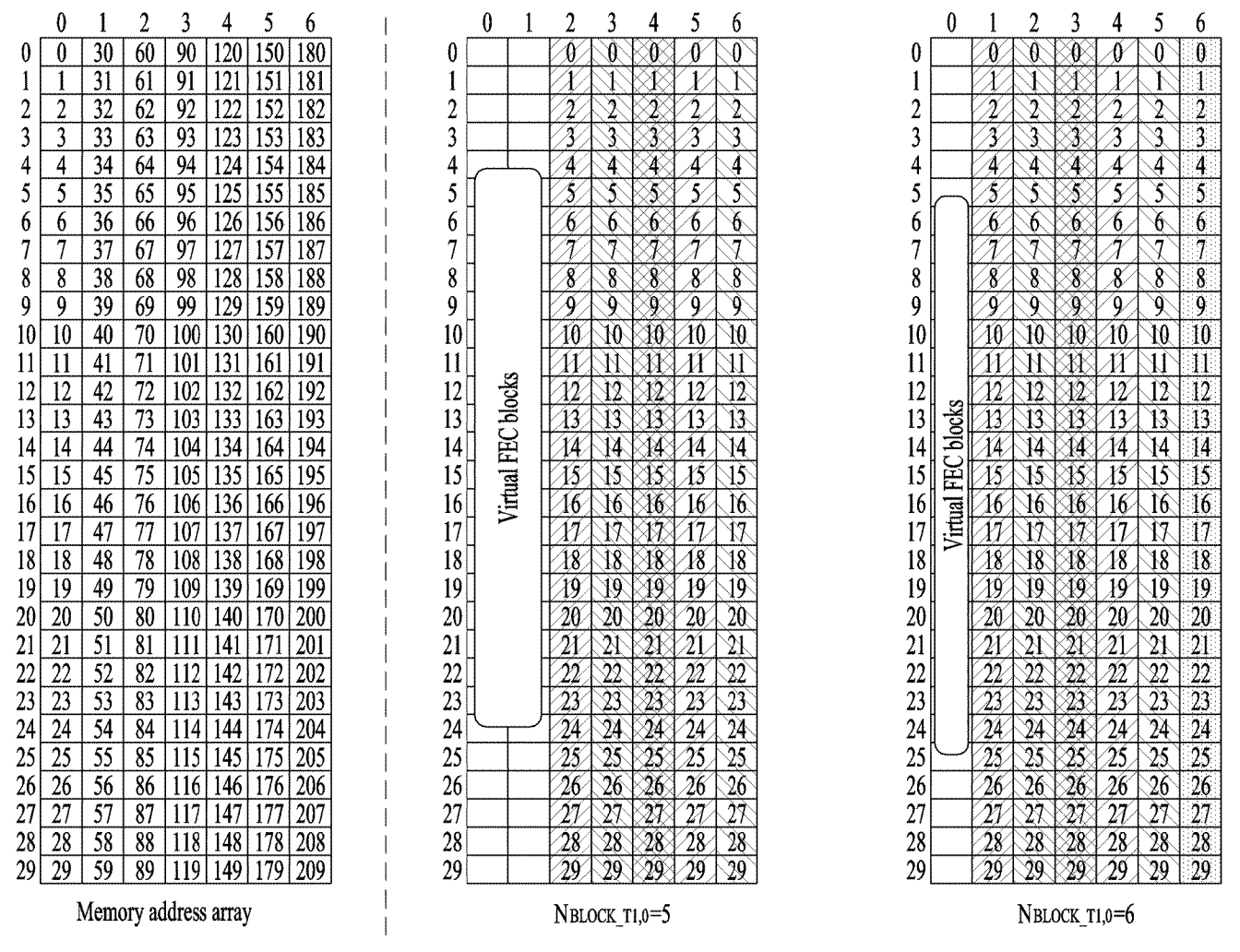

FIG. 9 is a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
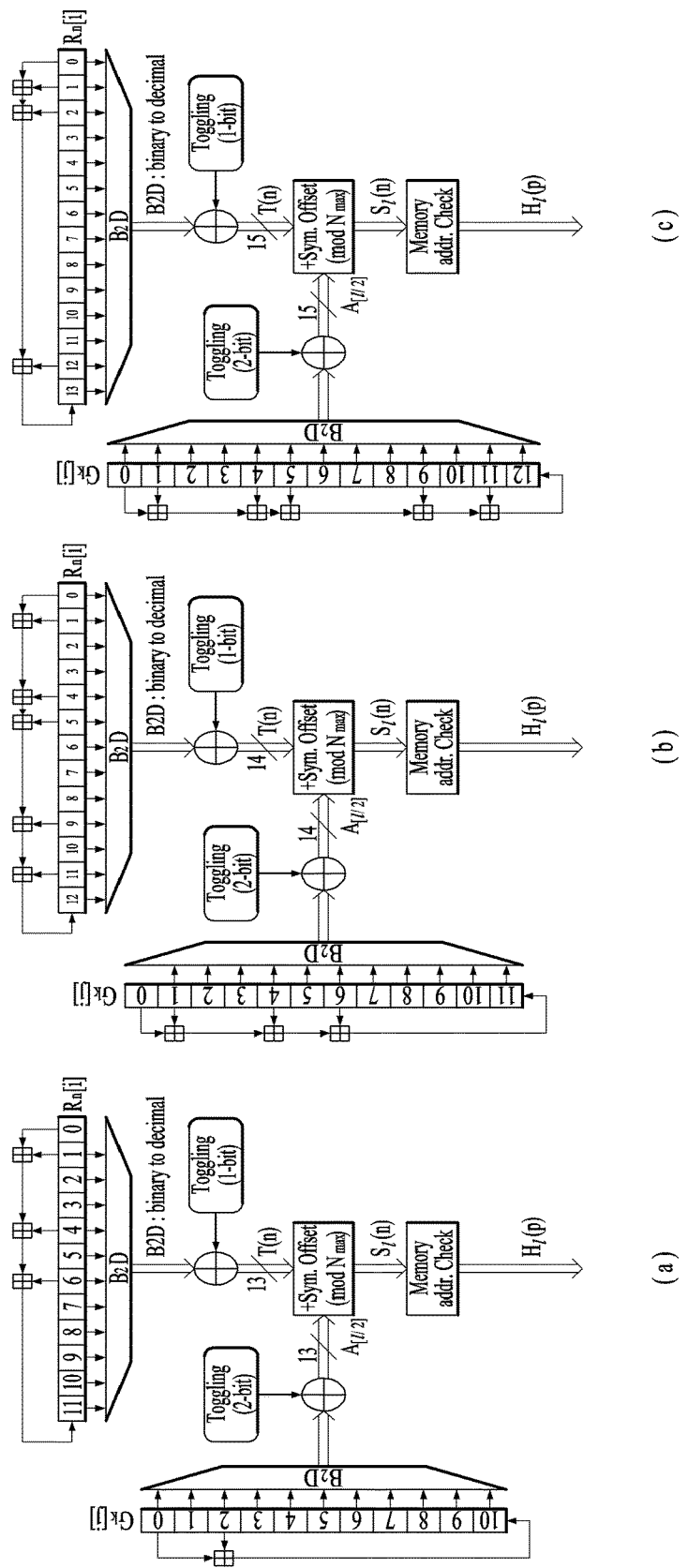
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,Ndata-1}]$ with respect to l=0, . . . , $N_{sym}$-1. In this case, $x_{m,l,p}$ may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,Ndata-1}]$ with respect to l=0, . . . , $N_{sym}$-1.

With respect to an OFDM symbol pair, an interleaved OFDM symbol pair may be given according to $v_{m,l,Hi(p)}=x_{m,l,p}$, p=0, . . . , $N_{data}$-1 for a first OFDM symbol of each pair and given according to $v_{m,l,p}=x_{m,l,Hi(p)}$, p=0, . . . , $N_{data}$-1 for a second OFDM symbol of each pair. In this case, $H_l(p)$ may be an interleaving address generated based on a cyclic shift value (symbol offset) of a PRBS generator and a sub-PRBS generator.

Figure 11:
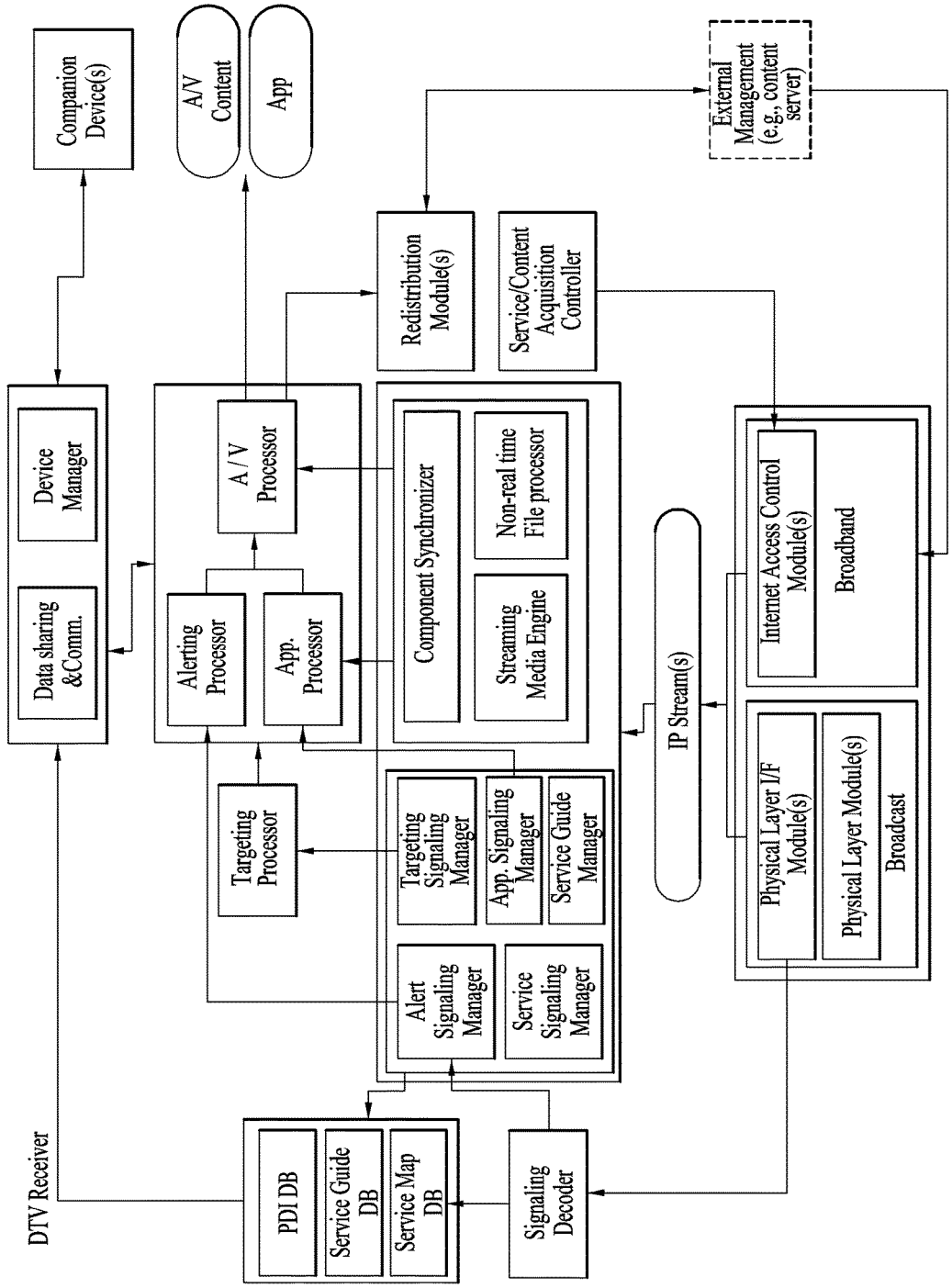
FIG. 11 is a block diagram illustrating a hybrid broadcast reception apparatus according to an embodiment of the present invention.

FIG. 11 is a block diagram illustrating a hybrid broadcast reception apparatus according to an embodiment of the present invention.

A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame, GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram, parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 12:
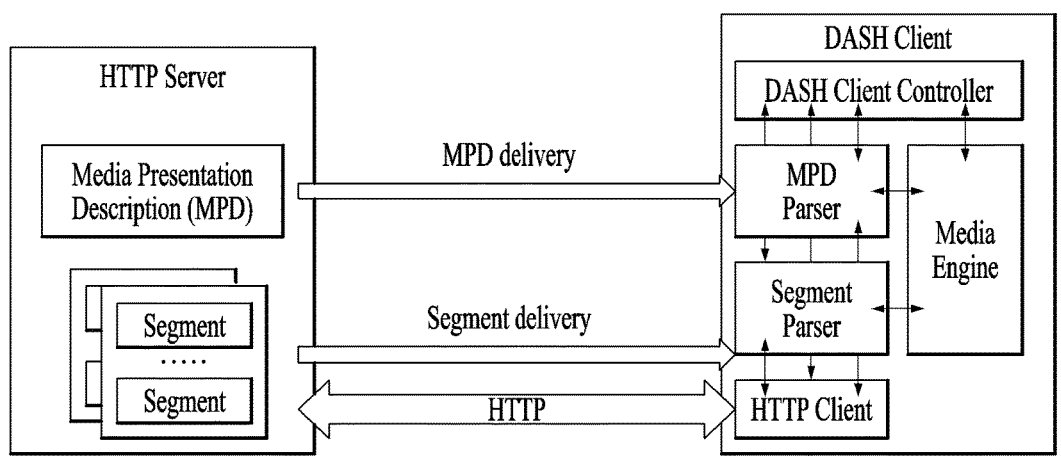
FIG. 12 is a diagram showing an overall operation of a DASH-based adaptive streaming model according to an embodiment of the present invention.

FIG. 12 is a diagram showing an overall operation of a DASH-based adaptive streaming model according to an embodiment of the present invention.

The present invention proposes a next-generation media service providing method for providing high dynamic range (HDR) supportable content. The present invention proposes related metadata and a method of transmitting the metadata when HDR content for expressing sufficient brightness is provided. Thereby, content may be adaptively adjusted according to characteristics of various scenes of content and image quality with enhanced content may be provided.

In the case of UHD broadcast, etc., brightness that is not capable of being expressed by existing content, thereby providing sense of high realism. By virtue of introduction of HDR, an expression range of brightness of a content image is increased and, thus, a difference between characteristics for respective scenes of content may be increased compared with a previous case. To effectively express characteristics for respective scenes of content on a display, metadata may be defined and transmitted to a receiver. An image of content may be appropriately provided according to intention of a service provider based on the metadata received by the receiver.

The present invention proposes a method of signaling an HDR parameter related to a video track, a video sample, and so on of content for providing HDR based on a media file such as ISOBMFF. The present invention proposes a method of storing and signaling HDR flags and/or parameter related to a video track (stream). The present invention proposes a method of storing and signaling HDR flags and/or parameter related to a video sample, a video sample, or a video sample entry. The present invention proposes a method of storing and signaling a SEI NAL unit containing HDR related information.

The method of transmitting/transmitting HDR information according to the present invention may be used to generate content for supporting HDR. That is, when a media file of content for supporting HDR is generated, a DASH segment operating in MPEG DASH is generated, or MPU operating in MPEG MMT is generated, the method according to the present invention may be used. A receiver (which includes a DASH client, an MMT client, or the like) may acquire HDR information (flag, parameter, box, etc.) from a decoder and so on and may effectively provide corresponding content based on the information.

The below-described HDR configuration box or HDR related flag information may be simultaneously present in a plurality of boxes in a media box, a DASH segment, or MMT MPU. In this case, the HDR information defined in a higher box may be overridden by HDR information defined in a lower box. For example, when HDR information is simultaneously included in a tkhd box and a vmhd box, HDR information of the tkhd box may be overridden by HDR information of the vmhd box.

The DASH-based adaptive streaming model according to the illustrated embodiment may write an operation between an HTTP server and a DASH client. Here, a dynamic adaptive streaming over HTTP (DASH) may be a protocol for supporting HTTP-based adaptive streaming and may dynamically support streaming according to a network situation. Accordingly, AV content reproduction may be seamlessly provided.

First, the DASH client may acquire MPD. The MPD may be transmitted from a service provider such as a HTTP server. The MPD may be transmitted according to delivery according to the aforementioned embodiment. The DASH client may request a server of corresponding segments using access information to a segment described in the MPD. Here, the request may reflect a network state and may be performed.

The DASH client may acquire a corresponding segment and, then, process the segment in a media engine and, then, display the segment on a screen. The DASH client may reflect a reproduction time and/or a network situation in real time and make a request for and acquire a required segment (Adaptive Streaming). Thereby, content may be seamlessly reproduced.

The media presentation description (MPD) may be represented in the form of XML as a file containing detailed information for permitting the DASH client to dynamically acquire a segment. In some embodiments, the MPD may be the same as the aforementioned MPD.

A DASH client controller may reflect a network situation to generate a command for making a request for MPD and/or a segment. The controller may control the acquired information to be used in an internal block such as a media engine.

A MPD parser may parse the acquired MPD in real time. Thereby, the DASH client controller may generate a command for acquiring a required segment.

A segment parser may parse the acquired segment in real time. Internal blocks such as a media engine may perform a specific operation according to information included in a segment.

A HTTP client may make a request for required MPD and/or segment to a HTTP server. The HTTP client may transmit the MPD and/or segments acquired from the server to the MPD parser or the segment parser.

The media engine may display content on a screen using media data included in a segment. In this case, information of the MPD may be used.

Figure 13:
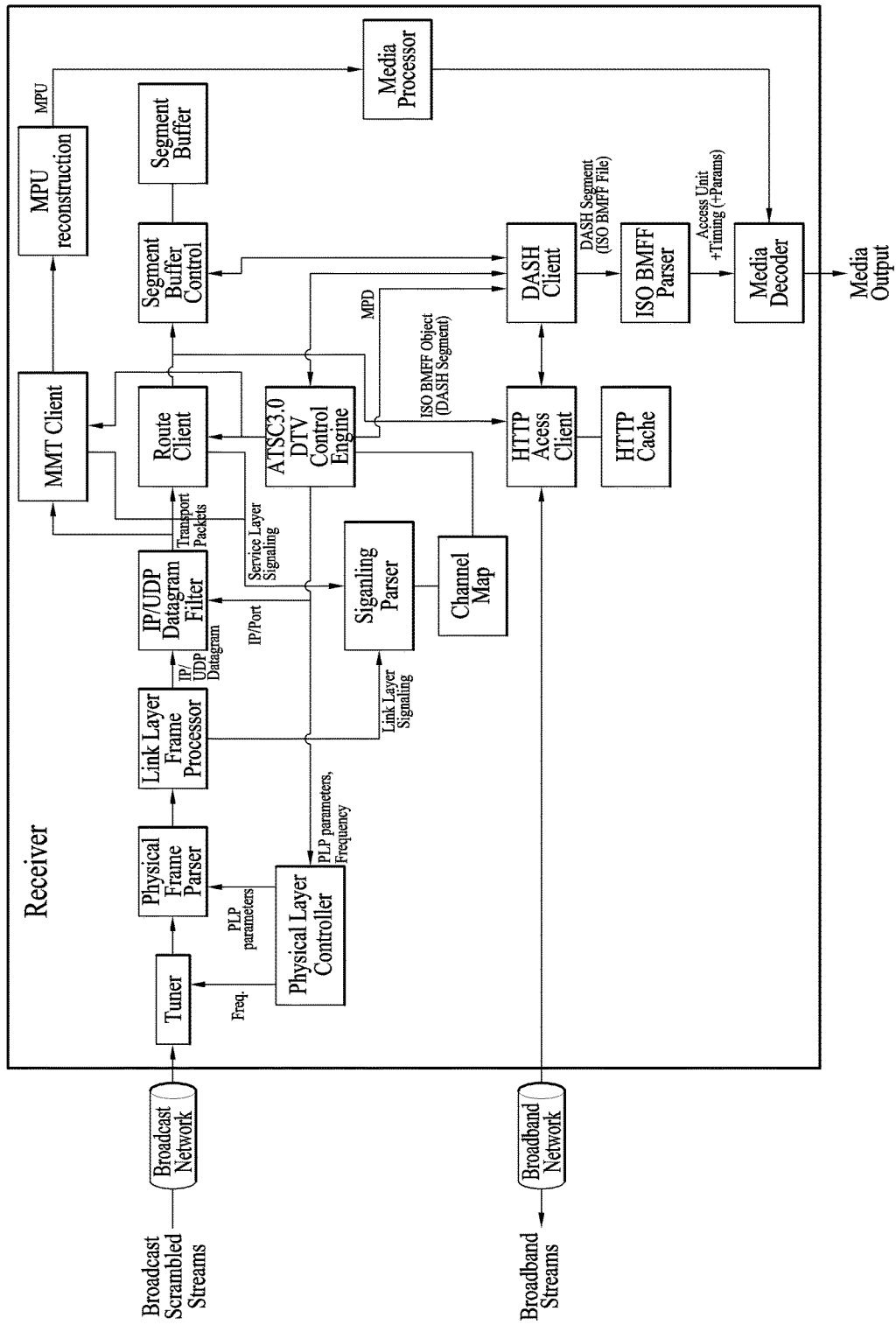
FIG. 13 is a block diagram of a receiver according to an embodiment of the present invention.

FIG. 13 is a block diagram of a receiver according to an embodiment of the present invention.

The receiver according to the illustrated embodiment may include a tuner, a physical layer controller, a physical frame parser, a link layer frame processor, an IP/UDP datagram filter, a DTV control engine, a route client, a segment buffer control, an MMT client, an MPU reconstruction, a media processor, a signaling parser, a DASH client, an ISO BMFF parser, a media decoder, and/or an HTTP access client. Each detailed block of the receiver may be a hardware processor.

The tuner may receive and process a broadcast signal through a terrestrial broadcast channel to tune the broadcast signal in a proper form (physical frame, etc.). The physical layer controller may control operations of the tuner, the physical frame parser, etc. using RF information, etc. of a broadcast channel as a reception target. The physical frame parser may parse the received physical frame and acquire a link layer frame, etc. via processing related to the physical frame.

The link layer frame processor may acquire link layer signaling, etc. from the link layer frame or may acquire IP/UDP datagram and may perform related calculation. The IP/UDP datagram filter may filter specific IP/UDP datagram from the received IP/UDP datagram. The DTV control engine may mange an interface between components and control each operation via transmission of a parameter, etc.

The route client may process a real-time object delivery over unidirectional transport (ROUTE) packet for supporting real-time object transmission and collect and process a plurality of packets to generate one or more base media file format (ISOBMFF) objects. The segment buffer control may control a buffer related to segment transmission between the route client and the dash client.

The MMT client may process a MPEG media transport (MMT) transport protocol packet for supporting real-time object transmission and collect and process a plurality of packets. The MPU reconstruction may reconfigure a media processing unit (MPU) from the MMTP packet. The media processor may collect and process the reconfigured MPU.

The signaling parser may acquire and parse DTV broadcast service related signaling (link layer/service layer signaling) and generate and/or manage a channel map, etc. based thereon. This component may process low level signaling and service level signaling.

The DASH client may perform real-time streaming or adaptive streaming related calculation and process the acquired DASH segment, etc. The ISO BMFF parser may extract data of audio/video, a related parameter, and so on from the ISO BMFF object. The media decoder may process decoding and/or presentation of the received audio and video data. The HTTP access client may make a request for specific information to the HTTP server and process response to the request.

Figure 14:
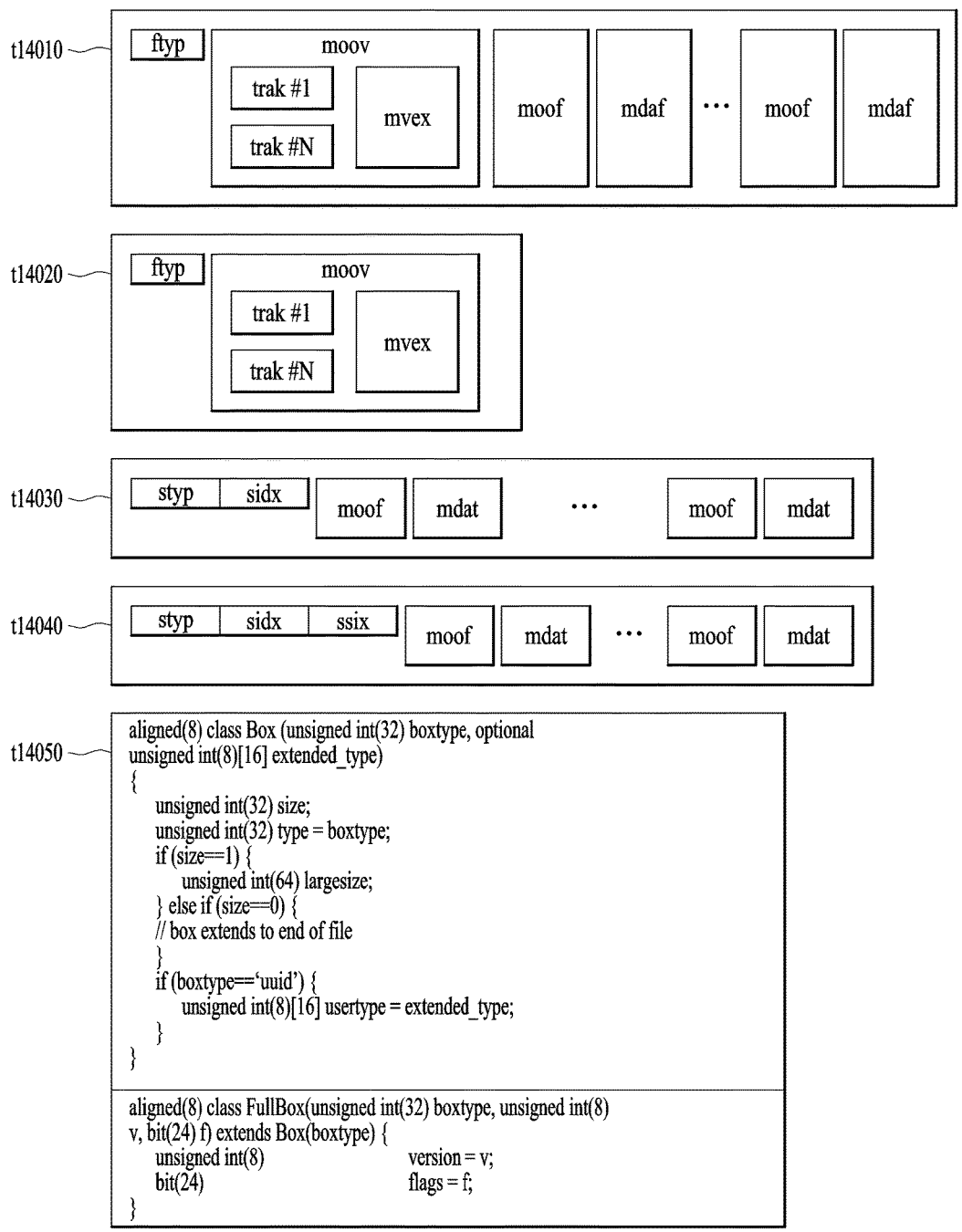
FIG. 14 is a diagram showing a configuration of a media file according to an embodiment of the present invention.

FIG. 14 is a diagram showing a configuration of a media file according to an embodiment of the present invention.

To store and transmit media data such as audio or video, formalized media file format may be defined. In some embodiments, the media file according to the present invention may have a file format based on ISO base media file format (ISO BMFF).

The media file according to the present invention may include at least one box. Here, the box may be a data block or object including media data or metadata related to media data. Boxes may be an inter-hierarchical structure and, thus, media may be classified according to the inter-hierarchical structure such that a media file has a format appropriate to store and/or transmit large-scale media data. The media file may have a structure for easily accessing media information, for example, a structure for permitting a user to move a specific point of media content.

The media file according to the present invention may include a ftyp box, a moov box, and/or a mdat box.

The ftyp box (file-type box) may provide a file type or compatibility related information of a corresponding media file. The ftyp box may include configuration version information of media data of a corresponding media file. A decoder may identify a corresponding media file with reference to the ftyp box.

The moov box (movie box) may be a box including metadata of media data of a corresponding media file. The moov box may function as a container of all metadata. The moov box may be a box of an uppermost layer among metadata related boxes. In some embodiments, only one moov box may be present in a media file.

The mdat box (media data box) may be a box containing actual media data of a corresponding media file. The media data may include an audio sample and/or video samples and the mdat box may function as a container containing the media samples.

In some embodiments, the aforementioned moov box may further include a mvhd box, a trak box, and/or a mvex box as a lower box.

The mvhd box (movie header box) may include media presentation related information of media data included in a corresponding media file. That is, the mvhd box may include information such as media generation time, change time, time interval, period, etc. of corresponding media presentation.

The trak box (track box) may provide information related to a track of corresponding media data. The trak box may include information such as stream related information, presentation related information, and access related information of an audio track or a video track. A plurality of trak boxes may be present according to the number of tracks.

In some embodiments, the trak box may further include a tkhd box (track header box) as a lower box. The tkhd box may include information on a corresponding track indicated by the trak box. The tkhd box may include information such as generation time, change time, and track identifier of a corresponding track.

The mvex box (movie extend box) may indicate that the below-described moof box is present in a corresponding media file. To know all media samples of a specific track, moof boxes need to be scanned.

In some embodiments, the media file according to the present invention may be divided into a plurality of fragments (t14010). Thereby, the media file may be segmented and stored or transmitted. Media data (mdat box) of the media file may be segmented into a plurality of fragments and each fragment may include a moof box and the segmented mdat box. In some embodiments, to use fragments, information of the ftyp box and/or the moov box may be required.

The moof box (movie fragment box) may provide metadata of media data of a corresponding fragment. The moof box may be a box of an uppermost layer among metadata related boxes of a corresponding fragment.

The mdat box (media data box) may include actual media data as described above. The mdat box may include media samples of media data corresponding to each corresponding fragment.

In some embodiments, the aforementioned moof box may include a mfhd box and/or a traf box as a lower box.

The mfhd box (movie fragment header box) may include information related to a relationship of a plurality of fragmented fragments. The mfhd box may include a sequence number and may indicate a sequence of data obtained by segmenting media data of a corresponding fragment. Whether segmented data is omitted may be checked using the mfhd box.

The traf box (track fragment box) may include information on a corresponding track fragment. The traf box may provide metadata of a segmented track fragment included in a corresponding fragment. The traf box may provide metadata to decode/reproduce media samples in a corresponding track fragment. A plurality of traf boxes may be present according to the number of track fragments.

In some embodiments, the aforementioned traf box may include a tfhd box and/or a trun box as a lower box.

The tfhd box (track fragment header box) may include header information of a corresponding track fragment. The tfhd box may provide information of a basic sample size, period, offset, and identifier with respect to media samples of a track fragment indicated by the aforementioned traf box.

The trun box (track fragment run box) may include corresponding track fragment related information. The trun box may include information such as a period, size, and reproduction time for each media sample.

The aforementioned media file and fragments of the media file may be processed and transmitted as segments. The segment may include initialization segment and/or media segment.

A file according to the illustrated embodiment t14020 may be a file containing information related to initialization of a media decoder except for media data. The file may correspond to, for example, the aforementioned initialization segment. The initialization segment may include the aforementioned ftyp box and/or moov box.

A file according to the illustrated embodiment t14030 may be a file containing the aforementioned fragment. The file may correspond to, for example, the aforementioned media segment. The media segment may include the aforementioned moof box and/or mdat box. The media segment may further include a styp box and/or a sidx box.

The styp box (segment type box) may provide information for identifying media data of a segmented fragment. The styp box may perform the same function as the aforementioned ftyp box with respect to the segmented fragment. In some embodiments, the styp box may have the same format as the ftyp box.

The sidx box (segment index box) may provide information indicating an index of a segmented fragment. Thereby, the box may indicate a sequence of the corresponding segmented fragment.

In some embodiments (t14040), a ssix box may be further included and the ssix box (sub segment index box) may be further segmented into sub segments and, in this case, may provide information indicating an index of the sub segment.

Boxes of a media file may include further extended information based on the box and FullBox form shown in the illustrated embodiment t14050. In this embodiment, a size field and a largesize field may indicate a length of a corresponding box in units of bytes. The version field may indicate a version of a corresponding box format. The type field may indicate a type and identifier of a corresponding box. The flags field may indicate a flag, etc. related to a corresponding box.

FIG. 15 is a diagram showing a HDR configuration box for providing HDR information according to an embodiment of the present invention.

To provide HDR information related to a video track and video samples in the media file, the HDR configuration box may be defined. The HDR configuration box may be positioned in a media file. In some embodiments, the HDR configuration box may be included in a moov box, a moof box, or a third box. The HDR configuration box may also be referred to as a hdrc box.

The HDR configuration box may include a hdr_config field. The hdr_config field may include an OETF_type field, a max_mastering_display_luminance field, a min_mastering_display_luminance field, a hdr_type_transition_flag field, a hdr_sdr_transition_flag field, a sdr_hdr_transition_flag field, a sdr_compatibility_flag field, an average_frame_luminance_level field, and/or a max_frame_pixel_luminance field.

The OETF_type field may indicate a type of a source opto-electronic transfer function (OETF) of a corresponding video data. When a value of the present field is 1, 2, and 3, these may correspond to types of ITU-R BT.1886, ITU-R BT.709, and ITU-R BT.2020, respectively. Other values may be reserved for future purpose.

The max_mastering_display_luminance field may indicate a peak luminance value of a mastering display of corresponding video data. The value may be an integer between 100 and 1000.

The min_mastering_display_luminance field may indicate a minimum luminance value of a mastering display of corresponding video data. The value may be a fractional number between 0 and 0.1.

The hdr_type_transition_flag field may be a flag indicating whether HDR information on corresponding video data is changed and a different type of HDR information is applied.

The hdr_sdr_transition_flag field may be a flag indicating whether corresponding video data is converted into SDR from HDR.

The sdr_hdr_transition_flag field may be a flag indicating whether corresponding video data is converted into HDR from SDR.

The sdr_compatibility_flag field may be a flag indicating whether corresponding video data is compatible with a SDR decoder or a SDR display.

The average_frame_luminance_level field may be an average value of a luminance level of one video sample. The present field may indicate a maximum value of average values of each luminance level of samples belonging to a sample group or a video track (stream) with respect to the same group or the video track (stream).

The max_frame_pixel_luminance field may indicate a maximum value of a pixel luminance value of one video sample. The present field may indicate a largest value of maximum values of each pixel luminance of each sample belonging to a sample group or a video track (stream) with respect to the sample group or the video track (stream).

The "corresponding video data" as a target described by the fields may a video track, a video sample group, or each video sample in a media file. According to a description target, a range described by each field may be changed. For example, the hdr_type_transition_flag field may indicate whether a corresponding video track is converted into SDR from HDR or whether one video sample is converted into SDR from HDR.

FIG. 16 is a diagram showing a method of defining HDR information in a tkhd box according to an embodiment of the present invention.

The HDR information may be included in the aforementioned media file structure and stored/transmitted. In the present embodiment, HDR information (parameters) may be added to the tkhd box in the aforementioned moov box. The added HDR information may be indicated by shadow.

In the illustrated embodiment (t16010), the hdr_flag field may be a flag indicating whether HDR video data is included in a corresponding video track described by the tkhd box. When a value of the field is 1, HDR video data may be included in a corresponding video track. When a value of the field is 1, the below-described 4 flag fields may be present.

Based on the hdr_flag and the below-described flag field value, whether video data in a corresponding video track is processed by a video decoder, etc. may be determined. For example, in the case of a decoder that is capable of processing only SDR, when HDR_flag=1 and SDR_compatibility=0, it may be seen that corresponding video data is not capable of being processed.

The hdr_type_transition_flag field may be a flag indicating whether HDR information (parameters) related to HDR video data in a corresponding video track is changed. When a value of the field is 1, HDR information on HDR video data in a corresponding video track may be changed to other HDR information.

The hdr_sdr_transition_flag field may be a flag indicating whether video data in a corresponding video track is converted into SDR from HDR. When a value of the field is 1, it may be seen that corresponding video data is converted into SDR from HDR.

The sdr_hdr_transition_flag field may be a flag indicating whether video data in a corresponding video track is converted into HDR from SDR. When a value of the field is 1, it may be seen that corresponding video data is converted into HDR from SDR.

The sdr_compatibility_flag field may be a flag indicating whether video data in a corresponding video track is compatible with a decoder and a display for supporting SDR. When a value of the field is 1, it may be seen that HDR video data in a corresponding video track is compatible with devices for supporting SDR. When a value of the field is 1, decoder/display devices for supporting SDR may determine whether HDR video data included in a corresponding video track is to be decoded/displayed.

In some embodiments, when a transition related flag is set to 1, a decoder, etc. may check data (SEI, etc.) in related video prior to video data processing.

In some embodiments (t16020), the aforementioned HDR configuration box may be added in the tkhd box. The hdr_flag field in the present embodiment may be the same as the hdr_flag field in the aforementioned embodiment (t16010). However, in this case, when a value of the hdr_flag field is 1, this may indicate that the hdr_config box having a HDR configuration box type instead of the aforementioned four flags may be present in the tkhd box.

Here, the hdr_config box may include HDR information on video data included in a corresponding video track. This box has the aforementioned HDR configuration box type and, thus, as described above, may include an OETF_type field, a max_mastering_display_luminance field, a min_mastering_display_luminance field, a hdr_type_transition_flag field, a hdr_sdr_transition_flag field, a sdr_hdr_transition_flag field, a sdr_compatibility_flag field, an average_frame_luminance_level field, and/or a max_frame_pixel_luminance field.

Definition of these fields is the same as the above description but, in this embodiment, the HDR configuration box is present in the tkhd box and, thus, the fields may describe information on a corresponding video track. For example, the OETF_type field may indicate an OETF type of video data in the "corresponding video track". In particular, the hdr_type_transition_flag field, the hdr_sdr_transition_flag field, the sdr_hdr_transition_flag field, and/or the sdr_compatibility_flag field may have the same meaning as the four flag fields in the aforementioned embodiment (t16010).

In some embodiments, the average_frame_luminance_level field in the HDR configuration box may indicate a maximum value among average values of luminance levels of each of video samples in the corresponding video track. In addition, the max_frame_pixel_luminance field may indicate a largest value among maximum values of pixel luminance of each of the video samples in the corresponding video track.

FIG. 17 is a diagram showing a method of defining HDR information in a vmhd box according to an embodiment of the present invention.

HDR information may be contained in the aforementioned media file structure and may be stored/transmitted. In the present embodiment, HDR information (parameters) may be added to the vmhd box in the aforementioned trak box. The added HDR information may be indicated by shadow.

Here, the vmhd box (video media header box) may be a lower box of the aforementioned trak box and may provide general presentation related information of a corresponding video track.

In the illustrated embodiment (t17010), the hdr_flag field may be included. According to a value of the hdr_flag field, a hdr_type_transition_flag field, a hdr_sdr_transition_flag field, a sdr_hdr_transition_flag field, and/or a sdr_compatibility_flag field may be further include. These fields may perform the same functions as those of fields with the same titles in the aforementioned tkhd box.

In the illustrated embodiment (t17020), the hdr_flag field may be included. According to a value of the hdr_flag field, a hdr_config box as the HDR configuration box may be further included. The hdr_flag field and the hdr_config box may perform the same function as that of a field with the same title in the aforementioned tkhd box.

That is, in the illustrated embodiments, HDR information in the vmhd box may provide HDR information of video data included in a corresponding video track.

In some embodiments, the tkhd box and the vmhd box may simultaneously include HDR information. In this case, embodiments of the HDR information structure included in each box may be combined. When HDR information is simultaneously included in the tkhd box and the vmhd box, a value of the HDR information defined in the tkhd may be overridden by a value of the HDR information defined in the vmhd box. That is, when values of the HDR information defined in the both boxes, a value of the vmhd box may be used. When HDR information is not included in the vmhd box, HDR information in the tkhd box may be used.

FIG. 18 is a diagram showing a method of defining HDR information in a trex box according to an embodiment of the present invention.

HDR information may be contained in the aforementioned media file structure and may be stored/transmitted. In the present embodiment, HDR information (parameters) may be added to the trex box in the aforementioned mvex box. The added HDR information may be indicated by shadow.

Here, the trex box (track extend box) may be a lower box of the aforementioned mvex box and may set up default values used by each movie fragment. This box may be provided as a default value and may reduce a space and complexity in the traf box.

The trex box may include a default_hdr_flag field and/or a default_sample_hdr_flag field. According to a value of the default_hdr_flag field, a default_hdr_config box as HDR configuration box may be further included. According to a value of the default_sample_hdr_flag field, a default_sample_hdr_config box as a HDR configuration box may be further included.

The default_hdr_flag field may be a flag indicating whether HDR video data is included in a video track fragment included in a corresponding fragment. When a value of the field is 1, this may indicate that HDR video data by default is included in a corresponding fragment. When a value of the field is 1, a default_hdr_config box as a HDR configuration box may be further included.

The default_hdr_config box may include HDR information that is commonly applied to video samples included in the corresponding video track fragment. The present box may include fields of the aforementioned HDR configuration box as the aforementioned HDR configuration box.

Among fields of the present box, other fields except for the average_frame_luminance_level field and/or the max_frame_pixel_luminance field may perform the same functions as those of fields with the same fields in the HDR configuration box included in the aforementioned tkhd box. The average_frame_luminance_level field may indicate a maximum value of average values of luminance levels of each of video samples belonging to a track fragment in a corresponding fragment. The max_frame_pixel_luminance field may indicate a largest value among maximum values of pixel luminance of each of video samples belonging to a track fragment in a corresponding fragment.

The default_sample_hdr_flag field may be a flag indicating whether HDR video samples are included in a video track fragment included in a corresponding fragment. When a value of the field is 1, this may indicate that HDR video samples are included by default in a corresponding fragment. When a value of the field is 1, a default_sample_hdr_config box as a HDR configuration box may be further included.

The default_sample_hdr_config box may include HDR information that is applicable to each of video samples included in a corresponding video track fragment. The present box may be the aforementioned HDR configuration box and may include fields of the aforementioned HDR configuration box.

Among fields of the present box, other fields except for the average_frame_luminance_level field and/or the max_frame_pixel_luminance field may perform the same functions as those of fields with the same fields in the HDR configuration box included in the aforementioned tkhd box. The average_frame_luminance_level field may indicate an average value of a luminance level of each of video sample belonging to a track fragment in a corresponding fragment. The max_frame_pixel_luminance field may indicate a maximum value of pixel luminance of each of video samples belonging to a track fragment in a corresponding fragment.

FIG. 19 is a diagram showing a method of defining HDR information in a tfhd box according to an embodiment of the present invention.

HDR information may be contained in the aforementioned media file structure and may be stored/transmitted. In the present embodiment, HDR information (parameters) may be added to the tfhd box in the aforementioned moof box. The added HDR information may be indicated by shadow.

In the illustrated embodiment (t19010), the hdr_flag field may be a flag indicating whether HDR video data is included in a corresponding video track fragment described by the tfhd box. When a value of the field is 1, HDR video data may be included in a corresponding video track fragment.

When a value of the hdr_flag field is 1, a hdr_type_transition_flag field, a hdr_sdr_transition_flag field, a sdr_hdr_transition_flag field, and/or a sdr_compatibility_flag field may be further included. These fields may perform the same functions as those of fields with the same titles in the aforementioned tkhd box. However, in this case, these fields may describe a corresponding video track fragment but not all video tracks.

That is, the hdr_type_transition_flag field may indicate whether HDR information is changed with respect to media data related to the track fragment in a corresponding track fragment. The hdr_sdr_transition_flag field may indicate that the corresponding track fragment is converted into SDR from HDR. The sdr_hdr_transition_flag field may indicate that a corresponding track fragment is converted into HDR from SDR. The sdr_compatibility_flag field may indicate whether HDR video data of a corresponding track fragment is compatible with a SDR decoder/display.

In the illustrated embodiment (t19020), the tfhd box may include the aforementioned HDR configuration box. According to a value of the hdr_flag field, whether a hdr_config box as a HDR configuration box is included may be indicated. The hdr_config box may provide HDR information that is commonly applicable to video samples of a corresponding track fragment.

Among fields of the present box, other fields except for the average_frame_luminance_level field and/or the max_frame_pixel_luminance field may perform the same functions as those of fields with the same fields in the HDR configuration box included in the aforementioned tkhd box. However, in this case, these fields may describe a corresponding video track fragment but not all video tracks.

The average_frame_luminance_level field may indicate a maximum value of average levels of a luminance level of each of video samples belonging to a track fragment in a corresponding fragment. The max_frame_pixel_luminance field may indicate a largest value among maximum values of pixel luminance of video samples belonging to a track fragment in a corresponding fragment.

In the illustrated embodiment (t19030), the tfhd box may further include HDR information according to a tf_flags value. The tr_flags may indicate flags associated with a corresponding box. For example, when the tr_flags has a value of 0x000001, this may indicate that base data offset information is included in the tfhd box and, when the tr_flags has a value of 0x000002, this may indicate that sample description index information is included in the tfhd box.

In some embodiments, when the tf_flags has a value of 0x100000, this may indicate that a default value of HDR information of video samples included in a track fragment in a corresponding fragment is present. A value of the tf_flags indicating that the HDR information is present may have different values other than a value of 0x100000 in some embodiments. (0x100000: default-sample-hdr-configuration-present)

When the tf_flags has a value of 0x100000, the tfhd box may include a deafult_sample_hdr_config box as a HDR configuration box. The deafult_sample_hdr_config box may perform the same function as the deafult_sample_hdr_config box in the aforementioned trex box.

FIG. 20 is a diagram showing a method of defining HDR information in a trun box according to an embodiment of the present invention.

HDR information may be contained in the aforementioned media file structure and may be stored/transmitted. In the present embodiment, HDR information (parameters) may be added to the trun box in the aforementioned traf box. The added HDR information may be indicated by shadow.

In the illustrated embodiment (t20010), the trun box may include a hdr_flag field. According to a value of the hdr_flag field, a hdr_type_transition_flag field, a hdr_sdr_transition_flag field, a sdr_hdr_transition_flag field, and/or a sdr_compatibility_flag field may be further included. These fields may signal HDR related items that are commonly applicable to video samples in a corresponding track fragment. These fields may have the same meaning as fields with the same title in the aforementioned tfhd box.

In some embodiments, HDR information may be simultaneously included in the tfhd box and the trun box. In this case, embodiments of the HDR information structure included in each box may be combined. When the HDR is simultaneously included in the tfhd box and the trun box, values of the HDR information defined in the tfhd box may be overridden by a value of the HDR information defined in the trun box. That is, when values of the HDR information defined in the both boxes, a value in the trun box may be used. When HDR information is not included in the trun box, the HDR information in the tfhd box may be used.

In the illustrated embodiment (t20020), the trun box may include a hdr_flag field and, according to a value of the hdr_flag field, a hdr_config as a HDR configuration box may be further included. The box may include HDR information that is commonly applicable to video samples in a corresponding track fragment. The fields in the box may have the same meaning as fields with the same titles of the HDR configuration box in the aforementioned tfhd box.

In the illustrated embodiment (t20030), the trun box may further include HDR information according to a value of the tf_flags. The tr_flags may indicate flags associated with a corresponding box. For example, when the tr_flags includes a value of 0x000001, this may indicate that data offset information is included in the trun box and, when the tr_flags includes a value of 0x000004, this may indicate that first sample flag information is included in the trun box.

In some embodiments, when the tf_flags has a value of 0x002000, this may indicate that HDR information that is commonly applicable to video samples included in a track fragment in a corresponding fragment is present. A value of the tf_flags indicating that the HDR information is present may have a different value other than a value of 0x002000 in some embodiments. (0x002000: hdr-configuration-present)

When the tf_flags has a value of 0x002000, the trun box may include a hdr_config as a HDR configuration box. The hdr_config box may perform the same function as the hdr_config box in the aforementioned tfhd box.

In the illustrated embodiment (t20040), the trun box may further include HDR information according to a tf_flags value. In some embodiments, when a tf_flags value is 0x001000, this may indicate that HDR information applicable to each of video samples included in a track fragment in a corresponding fragment is present. A value of the tf_flags indicating that the HDR information is present may have a different value other than a value of 0x001000 in some embodiments. (0x001000: sample-hdr-configuration-present)

When a value of the tf_flags is 0x001000, a sample_hdr_config box as a HDR configuration box may be included in the trun box. The sample_hdr_config box may provide HDR information of a corresponding sample.

The meaning of information in the sample_hdr_config box may be the same as the meaning of information in the deafult_sample_hdr_config box in the aforementioned tfhd box. That is, the deafult_sample_hdr_config of the tfhd box may provide default HDR information that is applicable to each sample and the sample_hdr_config box of the trun box may provide separate HDR information that is commonly applicable to a corresponding sample with respect to each sample.

However, the average_frame_luminance_level field and/or the max_frame_pixel_luminance field of the sample_hdr_config box may have different meaning from the default_sample_hdr_config box. The average_frame_luminance_level field may indicate an average value of a luminance level of a corresponding video sample. The max_frame_pixel_luminance field may indicate a maximum value of pixel luminance of a corresponding video sample.

FIG. 21 is a diagram showing a method of defining HDR information in various flags, sample group entry, or sample entry according to an embodiment of the present invention.

In the illustrated embodiment (t21010), HDR related flags shown on default_sample_flags in the trex box, default_sample_flags in the tfhd box, sample_flags in the trun box, and/or first_sample_flags in the trun box may be added.

First, a hdr_flag field may be included in a flag. The hdr_flag field may indicate that a corresponding media sample is a HDR video sample. When a value of the field is 1, this may indicate that a corresponding sample is a HDR video sample. In some embodiments, according to a value of the hdr_flag field, whether the below-described flag fields are present may be determined.

The sdr_compatibility_flag field, the hdr_type_transition_flag field, and/or the hdr_sdr_transition_flag field may have the same meaning as the aforementioned fields with the same titles but may be different in that a corresponding media sample (HDR video sample) is described.

That is, the sdr_compatibility_flag field may indicate whether a corresponding HDR video sample is compatible with a decoder/display for supporting SDR. The hdr_type_transition_flag field may indicate that HDR information (parameter) of a corresponding HDR video sample and HDR information of a HDR video sample subsequent thereto are different. When a value of the field is 1, this may indicate that a current sample is a last HDR video sample to which existing HDR information is applied and other HDR information is applied to the subsequent samples. The hdr_sdr_transition_flag field may be a flag indicating whether a current HDR video sample is a last HDR sample and the subsequent samples are SDR samples. When a value of the field is 1, this may indicate that a corresponding sample is a last HDR sample and SDR samples are subsequent thereto.

In the illustrated embodiment (t21020), HDR information may be included in visual sample group entry. When the same HDR related flag is applicable to one or more video samples present in one media or fragment, the HDR flags shown in the illustrated embodiment may be further included in the visual sample group entry.

The illustrated HDR related flags have the same meaning as the aforementioned flags with the same titles but, in this case, may describe a corresponding sample group. That is, the hdr_flag field may indicate whether a corresponding sample group is a HDR video sample group. The hdr_type_transition_flag field may indicate whether HDR information (parameter) related to HDR video samples is changed to other HDR information and applied in a corresponding HDR video sample. The hdr_sdr_transition_flag field may indicate whether HDR is converted into SDR in a corresponding video sample group. The sdr_hdr_transition_flag field may indicate whether SDR is converted into HDR in a corresponding video sample group. The sdr_compatibility_flag field may indicate whether HDR video samples in a corresponding video sample group are compatible with a decoder/display for supporting SDR.

In the illustrated embodiment (t21030), HDR information may included in the visual sample group entry. When the same HDR information (parameter) is applied in one or more video samples present in one or more files or fragments, the hdr_flag field and the HDR configuration box may be further included in the visual sample group entry, like in the illustrated embodiment.

Here, the hdr_flag field may have the same meaning as the hdr_flag field in the aforementioned visual sample group entry. Information in the HDR configuration box may have the same information in the aforementioned HDR configuration box. However, in this case, information may describe a corresponding sample group. That is, the information in the HDR configuration box may provide default HDR information (parameter) that is commonly applicable to HDR video samples in a corresponding sample group. Here, the average_frame_luminance_level field and/or the max_frame_pixel_luminance field may have different meaning and the average_frame_luminance_level field may indicate a maximum value among average values of a luminance level of each video sample belonging to a corresponding sample group. The max_frame_pixel_luminance field may indicate a largest value of maximum values of pixel luminance of each video sample belonging to a corresponding sample group.

In the illustrated embodiment (t21040), HDR information may be included in visual sample entry. As initialization information required to decode each of video samples present in one media file or fragments, HDR flag information related to a corresponding sample may be further included in the visual sample entry.

The hdr_flag field may indicate whether an associated video track, sample, or the like includes a HDR video sample. The hdr_type_transition_flag field may indicate whether HDR information (parameter) of a related video track, sample, or the like is changed and other HDR information is applied. The hdr_sdr_transition_flag field may be a flag indicating whether a related video track, sample, or the like is changed to SDR from HDR. The sdr_hdr_transition_flag field may be a flag indicating whether an associated video track, sample, or the like is converted into HDR from SDR. The sdr_compatibility_flag field may be a flag indicating whether a related video track, sample, or the like is compatible with a SDR decoder/display.

In the illustrated embodiment (t21050), HDR information may be included in visual sample entry. As initialization information required to decode each of video samples present in one media file or fragment, HDR information (parameter) related to a corresponding sample may be further included in the visual sample entry.

The hdr_flag field may indicate whether an associated video track, sample, or the like includes a HDR video sample. The hdr_config box may be a HDR configuration box and may include HDR information (parameter) of a related video track, sample, or the like. Information included in the aforementioned HDR configuration box may be the same as in the above description. In this case, each information piece may describe a related video track or samples.

FIG. 22 is a diagram showing a method of defining HDR information in a HEVC sample entry, a HEVC configuration box, or HEVC decoder configuration record, according to an embodiment of the present invention.

In the illustrated embodiment (t22010), HDR information may be included in HEVC sample entry (HEVCSampleEntry). As initialization information required for decoding each of HEVC samples present in a media file or a fragment, HDR information related to each HEVC sample, etc. may be added as shown in the drawing. The added HDR information may be added in the form of the aforementioned HDR configuration box. In some embodiments, the HDR information may be added to AVC sample entry (AVCSampleEntry), AVC2 sample entry (AVC2SampleEntry), SVC sample entry (SVCSampleEntry), MVC sample entry (MVCSampleEntry), and so on using the same method.

In the illustrated embodiment (t22020), HDR information may be included in HEVC configuration box (HEVCConfigurationBox). As initialization information required for decoding each of HEVC samples present in a media file or fragment, HDR information related to each HEVC sample, etc. may be added as shown in the drawing. The added HDR information may be added in the form of the aforementioned HDR configuration box. In some embodiments, the HDR information may be added to AVC configuration box (AVCConfigurationBox), SVC configuration box (SVCConfigurationBox), MVC configuration box (MVCConfigurationBox), and so on using the same method.

In the illustrated embodiment (t22030), HDR information may be included in HEVC decoder configuration record (HEVCDecoderConfigurationRecord). As initialization information required for decoding each of HEVC samples present in a media file or a fragment, HDR information related to each HEVC sample, etc. may be added as shown in the drawing. The added HDR information may be added in the form of the aforementioned HDR configuration box. In this case, whether the HDR configuration box is added may be performed by the hdr_flag field. In some embodiments, HDR information may be added to AVC decoder configuration record (AVCDecoderConfigurationRecord), SVC decoder configuration record (SVCDecoderConfigurationRecord), MVC decoder configuration record (MVCDecoderConfigurationRecord), and so on using the same method.

FIG. 23 is a diagram showing a method of defining a HDR information SEI box and storing/transmitting HDR information according to an embodiment of the present invention.

According to the present invention, HDR information SEI box (HDRInformationSEIBox) may be defined (t23010). The box may include a SEI NAL unit and the SEI NAL unit may have an SEI message including HDR related information. The HDR information SEI box may also be referred to as a hisb box.

The HDR information SEI box may be included in a visual sample entry, a HEVC configuration box, and/or a HEVC sample entry as in the illustrated embodiments (t23020, t23030, and t23040). In some embodiments, the information may be included in AVC sample entry, an MVC sample entry, and an SVC sample entry.

Figure 24:
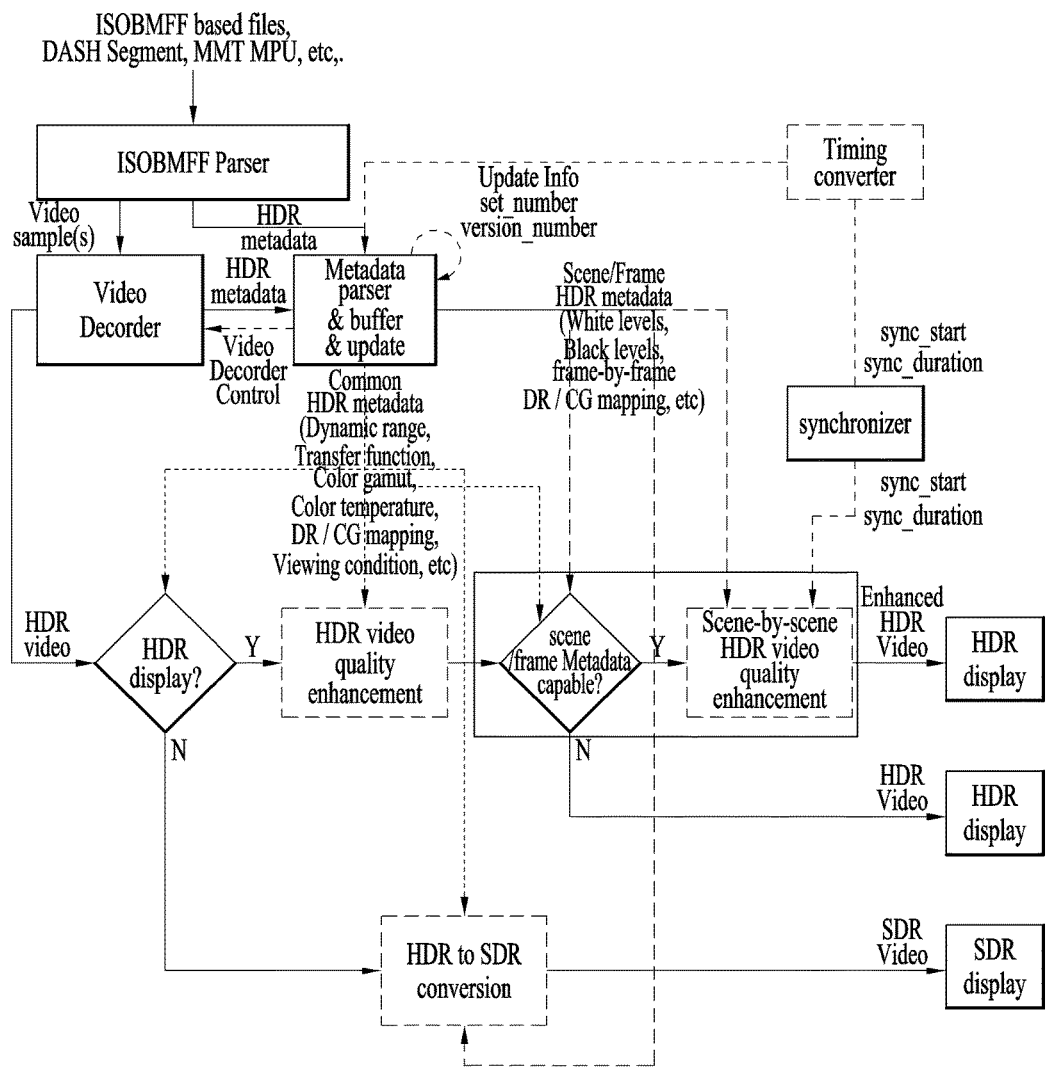
FIG. 24 is a diagram showing an operation of a media engine based on HDR information processing capability according to an embodiment of the present invention.

FIG. 24 is a diagram showing an operation of a media engine based on HDR information processing capability according to an embodiment of the present invention.

A parser (ISOBMFF parser) of a receiver may parse an ISOBMFF-based media file, a DASH segment, and/or an MMT MPU. According to the parsing result, video samples may be transmitted to a video decoder and HDR information (metadata) may be transmitted to a metadata parser.

The video decoder may decode video samples to acquire HDR video data. When the HDR information acquired during this procedure is present, the information may be transmitted to the metadata parser. The metadata parser may parse the received HDR metadata. Here, control information, etc. required in a video decoder may be transmitted to the video decoder using the acquired metadata. The metadata parser may update a buffer or metadata. The updating may be performed using set_number, version_number, etc.

The case may be identified according to whether a receiver is capable of display HDR video. When it is not possible to display HDR video, HDR video data may be transmitted to an SDR display block via HDR-SDR conversion. The SDR display block may be a hardware block and may receive and reproduce the converted SDR video. In this case, the information received from the parser may be used in conversion.

When the receiver is capable of displaying HDR display, quality enhancement may be performed on HDR video. In this case, quality enhancement may be performed using common HDR information (dynamic range, transfer function, color gamut, color temperature, DR/CG mapping, viewing condition, etc.) that is received from the metadata parser.

The case may be identified according to whether a receiver is capable of processing metadata for each scene/frame. When it is not possible to process the metadata for each scene/frame, a HDR display block of the receiver may reproduce the received HDR video data.

When it is possible to process the metadata for each scene/frame, scene-by-scene HDR video quality enhancement may be performed. In this case, quality enhancement may be performed using the scene/frame HDR metadata (while levels, black levels, frame-by-frame, DR/CG mapping, etc.) received from the metadata parser. In this case, the HDR display block of the receiver may reproduce enhanced HDR video. The HDR display block may be a hardware block.

A timing converter may transmit time related information to a metadata parser, a synchronizer, or the like. The synchronizer may provide information required for an operation of scene-by-scene HDR video quality enhancement using information such as sync_start and sync_duration.

FIG. 25 is a diagram showing a CG configuration box for providing color gamut information according to an embodiment of the present invention.

The present invention proposes a method of providing a next-generation media service for providing wide color gamut (WCG) supportable content. The present invention proposes a method of defining metadata according to characteristics for each scene and transmitting the metadata with respect to a high-quality image service with characteristics of WCG, etc. Thereby, an image with enhanced image quality may be provided.

The present invention proposes a method of storing and signaling a color gamut related parameter related to video track of content, video sample, etc. based on a media file of ISOBMFF, etc. The present invention proposes a method of storing and signaling color gamut flags and/or parameters related to a video track (stream). The present invention proposes a method of storing and signaling color gamut flags and/or parameters related to a video sample, a video sample group, or a video sample entry. The present invention proposes a method of storing and signaling a SEI NAL unit including color gamut related information.

The method of storing/transmitting the color gamut information according to the present invention may be used to generate the WCG supportable content. That is, the method according to the present invention may be used to generate a media file of the WCG supportable content, to generate a DASH segment operating in MPEG DASH, or to generate MPU operating in MPEG MMT. The receiver (which includes a DASH client, a MMT client, etc.) may acquire color gamut information (flag, parameter, box, etc.) and may effectively provide corresponding content based on the information.

The below-described CG configuration box or color gamut related flag information may be simultaneously present in a plurality of boxes in a media file, a DASH segment, or MMT MPU. In this case, the color gamut defined in a higher box may be overridden by the color gamut information defined in a lower box. For example, when color gamut information is simultaneously included in the tkhd box and the vmhd box, the color gamut information of the tkhd box may be overridden by the color gamut information of the vmhd box.

To store and signal color gamut information related to a video track (stream), a sample, etc. during generation of a media file, the CG configuration box may be defined (t25010). The CG configuration box may be positioned in a media file. In some embodiments, the CG configuration box may be included in a moov box, a moof box, or a third box. The CG configuration box may also be referred to as a cgcf box.

The CG configuration box may have a cg_config field. The cg_config field may include a color_gamut_type field, a color_space_transition_flag field, a wcg_scg_transition_flag field, a scg_wcg_transition_flag field, a scg_compatibility_flag field, and/or a color_primary_flag field. According to a value of the color_primary_flag field, a color_primaryRx field, a color_primaryRy field, a color_primaryGx field, a color_primaryGy field, a color_primaryBx field, a color_primaryBy field, a color_whitePx field, and/or a color_whitePy field may be further included.

The color_gamut_type field may indicate a type of color gamut of corresponding video data. That is, the field may indicate chromaticity coordinates of source primaries. According to a value of the field, a value of color primaries of video usability information (VUI) may be indicated. In some embodiments (t25020), values of the present field may be indicated as shown in the drawing.

The color_space_transition_flag field may be a flag indicating whether chromaticity coordinates are changed to other chromaticity coordinates with respect to corresponding video data.

The wcg_scg_transition_flag field may be a flag indicating whether corresponding video data is converted into standard color gamut (SCG) from wide color gamut (WCG). For example, when WCG of BT.2020 is converted into SCG of BT.709, a value of the field may be set to 1.

The scg_wcg_transition_flag field may be a flag indicating whether corresponding video data is converted into WCG from SCG. For example, when SCG of BT.709 is converted into WCG of BT.2020, a value of the field may be set to 1.

The scg_compatibility_flag field may be a flag indicating whether corresponding WCG video is compatible with an SCG-based decoder and display. That is, when an existing SCG decoder and display are used, even if separate mapping information is not used or updated, whether corresponding WCG video is capable of being output may be checked via the field without an issue in terms of quality.

The color_primary_flag field may be a flag indicating whether detailed information of chromaticity coordinates of color primaries of corresponding video is present. When the aforementioned color_gamut_type field indicates "unspecified", detailed information of chromaticity coordinates of color primaries of corresponding video needs to be provided.

As described above, when the color_primary_flag field is set to 1, that is, when this indicates that detailed information is present, the below-described fields may be further included.

The color_primaryRx field and the color_primaryRy field may indicate x coordinate and y coordinate values of R-color of a corresponding video source, respectively. This is the form of fractional number between 0 and 1.

The color_primaryGx field and the color_primaryGy field may indicate x coordinate and y coordinate values of G-color of a corresponding video source, respectively. This is the form of fractional number between 0 and 1.

The color_primaryBx field and the color_primaryBy field may indicate x coordinate and y coordinate values of B-color of a corresponding video source, respectively. This is the form of fractional number between 0 and 1.

The color_whitePx field and the color_whitePy field may indicate x coordinate and y coordinate values of a white point of a corresponding video source, respectively. This is the form of fractional number between 0 and 1.

FIG. 26 is a diagram showing a method of defining color gamut information in a tkhd box according to an embodiment of the present invention.

In the present invention, information of two types of color gamut may be defined. One color gamut may be referred to as container color gamut and the other color gamut may be referred to as content color gamut.

The container color gamut may include color gamut related information used in encoding and decoding operations and/or an operation of mapping a decoded pixel value. The content color gamut may include information on color gamut of an original source. That is, the content color gamut may indicate an effective color space volume that is applicable to actual content.

For example, when container color gamut of video data is BT.2020, only some color regions instead of all color regions of BT.2020 may be used to express color of corresponding video. Accordingly, optimized image mapping may be performed using a color volume indicating an effective range of color expression applied to actual content. To this end, a primary for determining an effective color volume may be further signaled.

Accordingly, according to the present invention, when a media file is generated based on ISO BMFF, etc., container color gamut information and/or content color gamut information may be contained in the media file and stored and signaled. The color gamut information may be color gamut parameters related to a corresponding video track, stream, sample, and so on.

In the present embodiment, color gamut information (parameters) may be added to the tkhd box in the aforementioned moov box. The added color gamut information may be indicated by shadow.

In the illustrated embodiment (t26010), the tkhd box may include a container_wcg_flag field and/or a content_wcg_flag field. According to a value of the container_wcg_flag field and the content_wcg_flag field, a container_cg_config box and/or a content_cg_config box may be further included, respectively. The two boxes may have the same type as the aforementioned CG configuration box.

The container_wcg_flag field may be a flag indicating whether video samples of a corresponding video track (track described by the tkhd box) are encoded or decoded based on WCG. The field may indicate whether detailed information of the container color gamut is included in the tkhd box. When a value of the field is 1, this may indicate that video samples encoded based on WCG are included in a corresponding video track. When a value of the field is 1, container color gamut information related to video data related to a corresponding video track is present in the tkhd box. In this case, the tkhd box may include a container_cg_config box as a CG configuration box.

Whether a video decoder or the like is capable of processing video data in a corresponding video track based on the container_wcg_flag and related detailed field values may be determined.

The container_cg_config box may include container color gamut information of video data in a corresponding video track. The box may be a CG configuration box and may include fields of the aforementioned CG configuration box. These fields may describe information of the container color gamut based on the aforementioned definition with respect to a corresponding video track, that is, a track related to the tkhd box.

For example, the color_gamut_type field may indicate a container color gamut type of video samples of a corresponding video track. That is, the field may indicate chromaticity coordinates of color primaries used in decoding or to be used in decoding.

The color_space_transition_flag field may be a flag indicating whether chromaticity coordinates of color primaries used in encoding/to be used in decoding are changed to other chromaticity coordinates with respect to video samples of a corresponding video track.

The wcg_scg_transition_flag field may be a flag indicating whether container color gamut of video samples of a corresponding video track is converted into SCG from WCG.

The scg_wcg_transition_flag field may be a flag indicating whether container color gamut of video samples of a corresponding video track is converted into WCG from SCG.

The scg_compatibility_flag field may be a flag indicating whether container color gamut of video samples of a corresponding video track is compatible with a SCG-based decoder and display. The field is information on container color gamut and, thus, the field may indicate whether the SCG-based decoder/display is capable of decoding corresponding video data even if the SCG-based decoder/display does not know color gamut such as BT.2020.

The color_primary_flag field may be a flag indicating whether detailed information of chromaticity coordinates of color primaries to be used in encoding/decoding video samples of a corresponding video track is present.

According to a value of the color_primary_flag field, a color_primaryRx field, a color_primaryRy field, a color_primaryGx field, a color_primaryGy field, a color_primaryBx field, a color_primaryBy field, a color_whitePx field, and/or a color_whitePy field may be included, as described above. These fields may indicate x and y coordinates of RGB color and white points of color primaries used/to be used in encoding/decoding, respectively.

The content_wcg_flag field may be a flag indicating that an actual color expression range of an original source is generated based on WCG with respect to the original source of video samples of a corresponding video track (track described by the tkhd box). In addition, the field may indicate whether detailed information of content color gamut is included in the tkhd box. In this case, detailed information of content color gamut may be included in the form of the aforementioned CG configuration box. This box may be referred to as a content_cg_config box.

Here, when the aforementioned container_wcg_flag field may have a value of 1 and content_wcg_flag field has a value of 0, it may be inferred that content of color gamut corresponding to original BT.709 is converted based on BT.2020 in an encoding operation. (BT.709, BT.2020 may be the exemplified color gamut type)

The content_cg_config box may include content color gamut information of video data of a corresponding video track. The box may be a CG configuration box and may include fields of the aforementioned CG configuration box. These fields may describe information of content color gamut according to the aforementioned definition with respect to a corresponding video track, that is, a track associated with the tkhd box.

For example, the color_gamut_type field may indicate a content color gamut type of video samples of a corresponding video track. That is, the field may indicate chromaticity coordinates of original source primaries of corresponding video data.

The color_space_transition_flag field may be a flag indicating whether chromaticity coordinates of original source primaries are changed to other chromaticity coordinates with respect to the original source primaries of video samples of a corresponding video track.

The wcg_scg_transition_flag field may be a flag indicating whether content color gamut of video samples of a corresponding video track is changed to SCG from WCG.

The scg_wcg_transition_flag field may be a flag indicating whether content color gamut of video samples of a corresponding video track is converted into WCG from SCG.

The scg_compatibility_flag field may be a flag indicating whether content color gamut of video samples of a corresponding video track is compatible with a SCG-based decoder and display. That is, when a value of the field is 1, this may indicate that an effective color expression range of corresponding video data is compatible with SCG and separate mapping, and so on are not required.

The color_primary_flag field may be a flag indicating whether detailed information of chromaticity coordinates of original source primaries of video samples of a corresponding video track is present.

According to a value of the color_primary_flag field, a color_primaryRx field, a color_primaryRy field, a color_primaryGx field, a color_primaryGy field, a color_primaryBx field, a color_primaryBy field, a color_whitePx field, and/or a color_whitePy field may be included, as described above. These fields may indicate RGB color of original source primaries and x and y coordinates of white points, respectively.

In the illustrated embodiment (t26020), the tkhd box may include a container_wcg_flag field and/or a content_wcg_flag field. According to a value of the container_wcg_flag field and the content_wcg_flag field, flags of the container color gamut and/or flags of content color gamut may be further included.

Flags of the container color gamut may include a container_color_space_transition_flag field, a container_wcg_scg_transition_flag field, a container_scg_wcg_transition_flag field, and/or a container_scg_compatibility_flag field. The respective fields may have the same meaning as the color_space_transition_flag field, the wcg_scg_transition_ flag field, the scg_wcg_transition_flag field, and/or the scg_compatibility_flag field in the aforementioned container_cg_ config box.

Flags of content color gamut may include a content_color_space_transition_flag field, a content_wcg_scg_transition_flag field, a content_scg_wcg_transition_flag field, and/or a content_scg_compatibility_flag field. The respective fields may have the same meaning as the color_space_transition_flag field, the wcg_scg_transition_flag field, the scg_wcg_transition_flag field, and/or the scg_compatibility_flag field in the aforementioned content_cg_config box.

FIG. 27 is a diagram showing a method of defining color gamut information in a vmhd box according to an embodiment of the present invention.

The color gamut information may be included in the aforementioned media file structure and stored/transmitted. In the present embodiment, the color gamut information (parameters) may be added to the vmhd box in the aforementioned trak box. The added color gamut information may be indicated by shadow.

In the illustrated embodiments (t27010 and t27020), the vmhd box may include the aforementioned container_wcg_flag field and/or content_wcg_flag field. According to values of the fields, flags of container color gamut or content color gamut may be included (t27010) or CG configuration boxes of container color gamut or content color gamut may be further included (t27020) as described above. Each flag and boxes may be the same as in the embodiments of the tkhd box.

In some embodiments, color gamut information may be simultaneously included in the tkhd box and the vmhd box. In this case, embodiments of color gamut information structure included in each box may be combined. When color gamut information is simultaneously included in the tkhd box and the vmhd box, the value of the color gamut information defined in the tkhd box may be overridden by the value of color gamut information defined in the vmhd box. That is, when the values of the color gamut information defined in the both boxes, the value of the vmhd box may be used. When color gamut information is not included in the vmhd box, color gamut information in the tkhd box may be used.

FIG. 28 is a diagram showing a method of defining color gamut information in a trex box according to an embodiment of the present invention.

Color gamut information may be contained in the aforementioned media file structure and may be stored/transmitted. In the present embodiment, color gamut information (parameters) may be added to the trex box in the aforementioned mvex box. The added color gamut information may be indicated by shadow.

The trex box may include a default_container_wcg_flag field and/or a default_content_wcg_flag field. According to a value of the default_container_wcg_flag field, a default_container_cg_config as a CG configuration box may be further included. According to a value of the default_content_wcg_flag field, a default_content_cg_config box as a CG configuration box may be further included.

When video data is included in a corresponding fragment, the default_container_wcg_flag field may be a flag indicating that the video data is encoded and decoded based on WCG by default. The field may indicate that the container color gamut information used by default is included in the trex box with respect to corresponding video data. The default container color gamut information may be included in the form of the default_container_cg_config as a CG configuration box.

The default_container_cg_config box may include default container color gamut information of video samples of a corresponding fragment. The present box may be a CG configuration box and the internal fields may have the same meaning as the above description. However, in this case, these fields may describe container color gamut of video samples included in a corresponding track fragment. These field values may be used as a default value of container color gamut information with respect to video samples of a corresponding track fragment.

The default_content_wcg_flag field may be a flag indicating that an original source of the video data is generated by default based on WCG when video data is included in a corresponding fragment. The field may indicate that content color gamut information to be used by default with respect to corresponding video data is included in the trex box. The default content color gamut information may be included in the form of a default_content_cg_config as a CG configuration box.

The default_content_cg_config box may include default content color gamut information of video samples of a corresponding fragment. The present box may be a CG configuration box and the internal fields may have the same meaning as the above description. However, in this case, the fields may describe content color gamut of video samples included in a corresponding track fragment. These field values may be used by default of content color gamut information with respect to video samples of a corresponding track fragment.

FIG. 29 is a diagram showing a method of defining color gamut information in a tfhd box according to an embodiment of the present invention.

The color gamut information may be included in the aforementioned media file structure and stored/transmitted. In the present embodiment, color gamut information (parameters) may be added to the tkhd box in the aforementioned moof box. The added color gamut information may be indicated by shadow.

In the illustrated embodiment (t29010), the tfhd box may include the aforementioned container_wcg_flag field and/or content_wcg_flag field. According to values of the fields, CG configuration boxes of the container color gamut or content color gamut may be further included, as described above. These may be a container_cg_config box and/or a content_cg_config box as a CG configuration box, respectively. Thereby, color gamut information that is commonly applicable to video samples in a corresponding track fragment may be provided. Each flag and boxes are the same as in the embodiment of the trex box.

In the illustrated embodiment (t29020), the tfhd box may further include color gamut information according to a value of tf_flags. In some embodiments, when a value of the tf_flags includes 0x400000, this may indicate that a default value of container color gamut information of video samples included in a track fragment in a corresponding fragment is present. A value of the tf_flags indicating that the container color gamut information is present may have a different value other than a value of 0x400000 in some embodiments. (0x400000: default-container-cg-configuration-present)

When a value of the tf_flags includes 0x400000, the tfhd box may include a default_container_cg_config box as a CG configuration box. The default_container_cg_config box may perform the same function as the default_container_cg_config box in the aforementioned trex box.

In some embodiments, when a value of the tf_flags includes 0x800000, this may indicate that a default value of content color gamut information of video samples included in a track fragment in a corresponding fragment is present. A value of the tf_flags indicating that the content color gamut information is present may have a different value other than a value of 0x800000. (0x800000: default-content-cg-configuration-present)

When a value of the tf_flags includes 0x800000, the tfhd box may include a default_content_cg_config as a CG configuration box. The default_content_cg_config box may perform the same function as the default_content_cg_config box in the aforementioned trex box.

FIG. 30 is a diagram showing a method of defining color gamut information in a trun box according to an embodiment of the present invention.

The color gamut information may be included in the aforementioned media file structure and stored/transmitted. In the present embodiment, the color gamut information (parameters) may be added to the trun box in the aforementioned traf box. The added color gamut information may be indicated by shadow.

In the illustrated embodiments (t30010), the trun box may include the aforementioned container_wcg_flag field and/or content_wcg_flag field. According to a value of the fields, CG configuration boxes of the container color gamut or content color gamut may be further included, as described above. These may be a container_cg_config box and/or a content_cg_config as a CG configuration box. Thereby, container/content color gamut related flags that are commonly applicable to video samples included in a corresponding track fragment may be stored and signaled. Each flag and boxes are the same as in the embodiment of the tfhd box.

In the illustrated embodiment (t31010), the trun box may further include the aforementioned container_wcg_flag field and/or content_wcg_flag field. According to values of the fields, flags related to container color gamut or content color gamut may be further included, as described above. Thereby, container/content color gamut information that is commonly applicable to video samples included in a corresponding track fragment may be stored and signaled. Each flag and boxes are the same as in the embodiment of the tkhd box. However, in this case, each field may describe container/content color gamut information of video samples included in a corresponding track fragment.

FIG. 31 is a diagram showing a method of defining color gamut information in a trun box according to another embodiment of the present invention.

In the illustrated embodiment (t31010), the trun box may further include color gamut information according to a value of tf_flags. In some embodiments, when a value of the tf_flags includes 0x010000, this may indicate whether container color gamut information that is commonly applicable to video samples included in a track fragment in a corresponding fragment is present. A value of the tf_flags indicating that container color gamut information is present may have a different value other than 0x010000 in some embodiments. (0x010000: container-cg-configuration-present)

When a value of the tf_flags includes 0x010000, a container_cg_config box as a CG configuration box may be included in a trun box. The container_cg_config box may perform the same function as the container_cg_config box in the aforementioned tfhd box.

In some embodiments, when a value of the tf_flags includes 0x020000, this may indicate that content color gamut information that is commonly applicable to video samples included in a track fragment in a corresponding fragment is present. A value of the tf_flags indicating that content color gamut information is present may have a different value other than 0x020000 in some embodiments. (0x020000: content-cg-configuration-present)

When a value of the tf_flags includes 0x020000, the trun box may include a content_cg_config box as a CG configuration box. The content_cg_config box may perform the same function as the content_cg_config box in the aforementioned tfhd box.

The CG configuration boxes may describe container/content color gamut information that is commonly applicable to video samples of a corresponding track fragment.

In the illustrated embodiment (t31020), the trun box may further include color gamut information according to a value of the tf_flags. In some embodiments, when a value of the tf_flags includes 0x100000, this may indicate whether container color gamut information that is separately applicable to each video sample of a track fragment in a corresponding fragment is present. A value of the tf_flags indicating that the container color gamut information is present may have a different value other than a value of 0x100000 in some embodiments. (0x100000: sample-container-cg-configuration-present)

When a value of the tf_flags includes 0x100000, the trun box may include a sample_container_cg_config box as a CG configuration box. The sample_container_cg_config box may perform the same function as the container_cg_config box in the aforementioned embodiment (t31010) but, in this case, each of the fields may describe container color gamut information that is separately applicable to each video sample of a corresponding track fragment.

In some embodiments, when a value of the tf_flags includes 0x200000, this may indicate whether content color gamut information that is separately applicable to each video sample of a track fragment in a corresponding fragment is present. A value of the tf_flags indicating that content color gamut information is present may have a different value other than 0x200000 in some embodiments. (0x200000: sample-content-cg-configuration-present)

When a value of the tf_flags includes 0x200000, the trun box may include a sample_content_cg_config box as a CG configuration box. The sample_content_cg_config box may perform the same function as the content_cg_config box in the aforementioned embodiment (t31010) but, in this case, each of the fields may describe content color gamut information that is separately applicable to each video sample of a corresponding track fragment.

That is, the CG configuration boxes may describe container/content color gamut information that is separately applicable to each sample with respect to video samples of a corresponding track fragment.

FIG. 32 is a diagram showing a method of defining color gamut information in various flags, sample group entry, or sample entry according to an embodiment of the present invention.

In the illustrated embodiment (t32010), color gamut related flags shown in default_sample_flags in a trex box, default_sample_flags in a tfhd box, sample_flags in a trun box, and/or first_sample_flags in a trun box may be added.

A container_wcg_flag field, a container_scg_compatibility_flag field, a content_wcg_flag field, and/or a content_scg_ compatibility_flag field may be included on the respective flags.

The container_wcg_flag field may be a flag indicating whether container color gamut of a corresponding sample is WCG. The container_scg_compatibility_flag field may be a flag indicating whether container color gamut of a corresponding sample is compatible with an SCG-based decoder/display. When a corresponding flag is set, a decoder/display for supporting only SCG may be capable of decoding a corresponding sample and may determine whether the corresponding sample is decoded and output.

The content_wcg_flag field may be a flag indicating whether content color gamut of a corresponding sample is WCG. The content_scg_compatibility_flag field may be a flag indicating whether content color gamut of a corresponding sample is compatible with a SCG-based decoder/display. When a corresponding flag is set, a decoder/display for supporting only SCG may be capable of processing a corresponding sample and may determine whether the corresponding sample is decoded/displayed.

In the illustrated embodiment (t32020), color gamut information may be included in visual sample group entry. When the same container/content color gamut related flag is applicable to one or more video samples present in one media file or fragment, color gamut flag like in the illustrated embodiment may be further included in the visual sample group entry.

Although the illustrated color gamut related flags have the same meaning as the aforementioned flags with the same title, a corresponding sample group may be described in this case. That is, the container_wcg_flag field may indicate whether container color gamut of a corresponding sample group is WCG. According to a value of the field, whether container color gamut related flags of a corresponding sample group are present may be indicated. The content_wcg_flag field may indicate whether content color gamut of a corresponding sample group is WCG. According to a value of the field, whether content color gamut flags of a corresponding sample group are present may be indicated.

The container_color_space_transition_flag field may be a flag indicating whether chromaticity coordinates of color primaries used in encoding or to be used in decoding of samples in a corresponding sample group is changed to other chromaticity coordinates. The container_wcg_scg_transition_flag field may be a flag indicating whether sample container color gamut in a corresponding sample group is converted into SCG from WCG. The container_scg_wcg_transition_flag field may be a flag indicating whether container color gamut of a sample in a corresponding sample group is converted into WCG from SCG. The container_scg_compatibility_flag field may be a flag indicating whether container color gamut of samples in a corresponding sample group is compatible with a SCG-based decoder/display.

The content_color_space_transition_flag field may be a flag indicating whether chromaticity coordinates of original source primaries of samples in a corresponding sample group is changed to other chromaticity coordinates. The content_wcg_scg_transition_flag field may be a flag indicating whether content color gamut of a sample in a corresponding sample group is converted into SCG from WCG. The content_scg_wcg_transition_flag field may be a flag indicating whether content color gamut of a sample in a corresponding sample group is converted into WCG from SCG. The content_scg_compatibility_flag field may be a flag indicating whether content color gamut of samples in a corresponding sample group is compatible with a SCG-based decoder/display.

In the illustrated embodiment (t32030), color gamut information may be included in visual sample group entry. When the same container/content color gamut information (parameter) is applied to one or more video samples present in one media file or fragments, container/content color gamut information may be further included in the visual sample group entry like in the illustrated embodiment.

Here, the visual sample group entry may include a container_wcg_flag field and/or a content_wcg_flag field. According to values of the fields, a container_cg_config box and/or content_cg_config box as a CG configuration box may be further included. Information in the CG configuration box may have the same meaning as information in the aforementioned CG configuration box. However, in this case, each of information pieces may describe a corresponding sample group. That is, information in the CG configuration box may provide container/content color gamut information that is commonly applicable to video samples in a corresponding sample group.

FIG. 33 is a diagram showing a method of defining color gamut information in various flags, sample group entry, or sample entry according to another embodiment of the present invention.

In the illustrated embodiment (t33010), color gamut information may be included in visual sample entry. As initialization information required for decoding each video sample present in one media file or fragment, color gamut related flags related to a corresponding sample may be further included in a visual sample entry.

The visual sample entry may include a container_wcg_flag field and/or a content_wcg_flag field. According to values of the fields, container/content color gamut related flags may be further included. The meaning of the flags may be the same as in definition in the aforementioned visual sample group entry but, in this case, each flag may describe one corresponding sample but not a sample group.

That is, the container_wcg_flag field may indicate that a sample in a related video track or a track fragment is encoded/decoded based on WCG. According to a value of the field, whether container color gamut related flags of a corresponding sample are present may be indicated. The content_wcg_flag field may indicate whether an original source of a sample in a related video track or a track fragment is generated based on WCG. According to a value of the field, whether content color gamut related flags of a corresponding sample are present may be indicated.

The container_color_space_transition_flag field may be a flag indicating whether chromaticity coordinates of color primaries of container color gamut of a corresponding video sample are changed to other chromaticity coordinates. The container_wcg_scg_transition_flag field may be a flag indicating whether container color gamut of a corresponding video sample is converted into SCG from WCG. The container_scg_wcg_transition_flag field may be a flag indicating whether container color gamut of a corresponding video sample is converted into WCG from SCG. The container_scg_compatibility_flag field may be a flag indicating whether container color gamut of a corresponding video sample is compatible with a SCG-based decoder/display.

The content_color_space_transition_flag field may be a flag indicating whether chromaticity coordinates of original source primaries of content color gamut of a corresponding video sample are changed to other chromaticity coordinates. The content_wcg_scg_transition_flag field may be a flag indicating whether content color gamut of a corresponding video sample is converted into SCG from WCG. The content_scg_wcg_transition_flag field may be a flag indicating whether content color gamut of a corresponding video sample is converted into WCG from SCG. The content_scg_compatibility_flag field may be a flag indicating whether content color gamut of a corresponding video sample is compatible with a SCG-based decoder/display.

In the illustrated embodiment (t33020), color gamut information may be included in visual sample entry. As initialization information required for decoding each video sample present in one media file or fragment, color gamut information (parameter) itself may be further included in a visual sample entry.

The container_wcg_flag field and/or the content_wcg_flag field may be included. According to values of the fields, a container_cg_config box and/or a content_cg_config box as a CG configuration box may be further included. Information in the CG configuration box may have the same meaning as information in the aforementioned CG configuration box. However, in this case, each of information pieces may describe a corresponding video sample.

FIG. 34 is a diagram showing a method of defining color gamut information in a HEVC sample entry, a HEVC configuration box, or HEVC decoder configuration record according to an embodiment of the present invention.

In the illustrated embodiment (t34010), color gamut information may be included in HEVC sample entry (HEVCSampleEntry). As initialization information required for decoding each of HEVC samples present in a media file or a fragment, color gamut information related to each HEVC sample, etc. may be added as shown in the drawing. The added color gamut information may be added in the form of the aforementioned CG configuration box in some embodiments. In some embodiments, the color gamut information may be added to AVC sample entry (AVCSampleEntry), AVC2 sample entry (AVC2SampleEntry), SVC sample entry (SVCSampleEntry), MVC sample entry (MVCSampleEntry), and so on using the same method.

In the illustrated embodiment (t34020), color gamut information may be included in HEVC configuration box (HEVCConfigurationBox). As initialization information required for decoding each of HEVC samples present in a media file or fragment, color gamut information related to each HEVC sample, etc. may be added as shown in the drawing. The added color gamut information may be added in the form of the aforementioned CG configuration box in some embodiments. In this case, whether the CG configuration box is added may be indicated by flag fields. In some embodiments, the color gamut information may be added to AVC configuration box (AVCConfigurationBox), SCV configuration box (SVCConfigurationBox), MVC configuration box (MVCConfigurationBox), etc. using the same method. In some embodiments, color gamut related flags, but not the CG configuration box may be included in the HEVC configuration box.

In the illustrated embodiment (t34030), color gamut information may be included in HEVC decoder configuration record (HEVCDecoderConfigurationRecord). As initialization information required for decoding each of HEVC samples present in a media file or fragment, color gamut information related to each HEVC sample, etc. may be added as shown in the drawing. The added color gamut information may be added in the form of the aforementioned CG configuration box in some embodiments. In this case, whether the CG configuration box is added may be performed by the container_cg_flag field and/or the content_cg_ flag field. In some embodiments, the color gamut information may be added to AVC decoder configuration record (AVCDecoderConfigurationRecord), SVC decoder configuration record (SVCDecoderConfigurationRecord), MVC decoder configuration record (MVCDecoderConfigurationRecord), etc. using the same method.

FIG. 35 is a diagram showing a method of defining a CG information SEI box and storing/transmitting color gamut information according to an embodiment of the present invention.

According to the present invention, CG information SEI box (CGInformationSEIBox) may be defined (t35010). The box may include a SEI NAL unit and the SEI NAL unit may have an SEI message including color gamut related information. The CG information SEI box may also be referred to as a cisb box.

The CG information SEI box may be included in the visual sample entry, the HEVC configuration box, and/or the HEVC sample entry, like in the illustrated embodiments (t35020, t35030, and t35040). In some embodiments, the box may be included in the AVC sample entry, the MVC sample entry, and the SVC sample entry.

Figure 36:
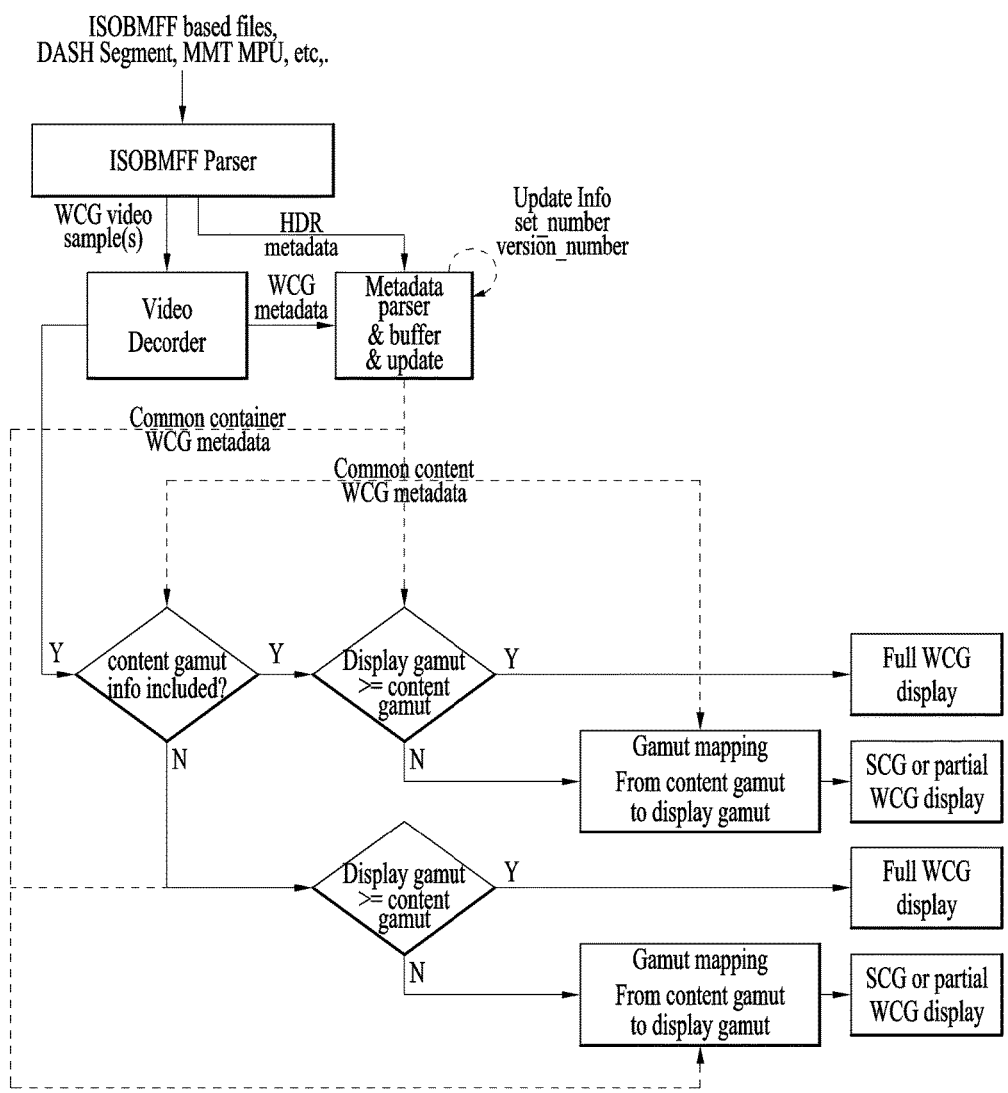
FIG. 36 is a diagram showing an operation of a media engine of a receiver based on WCG information processing capability according to an embodiment of the present invention.

FIG. 36 is a diagram showing an operation of a media engine of a receiver based on WCG information processing capability according to an embodiment of the present invention.

A parser (ISOBMFF parser) of a receiver may parse an ISOBMFF-based media file, a DASH segment, and/or MMT MPU. According to a parsing result, WCG video samples may be transmitted to a video decoder and color gamut information (metadata) may be transmitted to a metadata parser.

The video decoder may decode video samples to acquire WCG video data. When color gamut related information acquired during this procedure, the information may be transmitted to the metadata parser. The metadata parser may parse the received color gamut metadata. Here, the acquired container/content color gamut information may be used in a receiver processing procedure. The metadata parser may update a buffer or metadata. The updating may be performed using set_number, version_number, etc.

The case may be identified according to whether content color gamut information is included in received data. When the content color gamut information is not included in the data, the receiver may determine whether display color gamut is greater than or equal to container color gamut. When the display color gamut is greater than or equal to the container color gamut, the receiver may provide a full WCG display. When the display color gamut is smaller than container color gamut, the receiver may perform gamut mapping to display color gamut from container color gamut. Then, the receiver may provide SCG display or partial WCG display. During this procedure, common container color gamut related information transmitted from the metadata parser may be used.

On the other hand, when content color gamut information is included in received data, the receiver may determine whether the display color gamut is greater than or equal to the content color gamut. When the display color gamut is greater than or equal to the content color gamut, the receiver may provide full WCG display. When the display color gamut is smaller than the content color gamut, the receiver may perform gamut mapping to display color gamut from the content color gamut. Then, the receiver may provide SCG display or partial WCG display. During this procedure, common content color gamut related information received from the metadata parser may be used.

The present invention proposes a method of storing/transmitting HDR information and/or color gamut information using media file format. According to the present invention, HDR information and/or color gamut information may be defined in a corresponding media file but not a separate signaling path to enhance efficiency in various next-generation content systems for supporting UHD, hybrid broadcast, etc.

First, in the method proposed by the present invention, it may not be required to separately signal information of HDR and color gamut with respect to HDR media data or WCG media data. The information on HDR and WCG may be recognized by the media file itself and the receiver may recognize HDR or WCG related information prior to video data decoding and determine how the information is processed according to the determined information.

Without necessity of separate signaling of the HDR and color gamut related information, the information may be defined by the most basic media file and, thus, compatibility with various storing/transmitting systems. That is, without additional change in structures of the storing/transmitting system, any system using a corresponding media file format may use the method proposed by the present invention.

In addition, the media file may be generated by applying HDR and WCG related information, etc. and, thus, the receiver may provide media data according to receiver intention without change at a time of generating the corresponding media data. That is, HDR and WCG configuration of the media file itself may be provided as long as the configuration is not changed by signaling information, etc.

In addition, signaling for each level may be effectively performed using a box hierarchy structure in a media file. That is, default HDR and WCG values of a range (e.g., one track fragment) for covering a corresponding box in a higher level box may be defined and, then, separate HDR and WCG parameters with respect to a range (e.g., one video sample) for covering a corresponding box in a lower level box may be defined and may override a default value.

Figure 37:
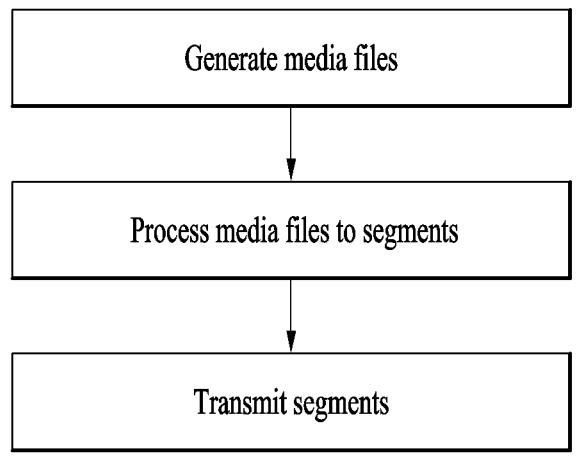
FIG. 37 is a diagram showing a method of transmitting media content according to an embodiment of the present invention.

FIG. 37 is a diagram showing a method of transmitting media content according to an embodiment of the present invention.

The method of transmitting media content according to an embodiment of the present invention may include generating media files, processing media files to segments, and/or transmitting segments.

First, a file generator of a transmitting side may generate media files including information on presentation of media content. The media file may be based on ISOBMFF. At least one of media file may include a movie block and/or at least one fragment. Here, the movie block may correspond to the aforementioned moov box. The movie block may include metadata of presentation of a corresponding media file. In some embodiments, the movie block may include at least one track block. Here, the track block may correspond to the aforementioned trak box. The track block may include metadata of a track of presentation.

The fragment may refer to a fragment of the aforementioned media file. At least one fragment may include a movie fragment block and/or a media data block. Here, the movie fragment block may correspond to the aforementioned moof box. The movie fragment block may provide metadata of presentation of a corresponding fragment. Here, the media data block may correspond to the aforementioned mdat box. The media data block may include video samples for presentation of corresponding fragment. That is, the media data block may include actual media for media presentation.

A segment processor of a transmitting side may process generated media files to a plurality of segments. Here, the segment may be a DASH segment. In some embodiments, the generating of the media file and the processing the media file to the segment may be simultaneously performed and may be performed via one step. That is, the transmitting side may directly generate a media segment. Here, the segment may include an initialization segment including a ftyp box and a moov box and a media segment including the aforementioned fragment.

A transmitter of the transmitting side may transmit the plurality of generated segments. Corresponding segments may be transmitted to the receiver via a broadcast network or broadband using an adaptive streaming method.

In some embodiments, the aforementioned track block may further include a track header block. The track header block may correspond to the aforementioned tkhd box. The track header block may describe characteristics of a corresponding track. Here, the track may refer to a specific track, etc. including an audio track, a video track, or a corresponding media. The track header block may include first HDR information or first WCG information. These may provide HDR and WCG information of video samples of the corresponding track, i.e., video data. These may be HDR information and WCG information in the aforementioned tkhd box. Here, the HDR information and the WCG information may comply with one of the description format in the aforementioned embodiments.

In a method of transmitting media content according to another embodiment of the present invention, the first HDR information may include a HDR flag indicating whether HDR video samples for supporting HDR are included in the corresponding track. Here, the HDR flag may correspond to the aforementioned hdr_flag field. The first HDR information may further include a HDR type flag indicating whether a HDR related parameter of HDR video samples is changed in the corresponding track. The HDR type flag may correspond to the aforementioned hdr_type_transition_flag field. The first HDR information may further include a SDR-HDR transition flag indicating whether video samples are converted into HDR video samples in SDR video samples for supporting SDR in the corresponding track. The SDR-HDR transition flag may correspond to the aforementioned hdr_sdr_transition_flag field. The first HDR information may further include a HDR-SDR transition flag indicating whether video samples are converted into SDR video samples from HDR video samples in a corresponding track. The HDR-SDR transition flag may be the aforementioned sdr_hdr_transition_flag field. The first HDR information may further include a SDR compatible flag indicating whether HDR video samples of a corresponding track are compatible with a decoder for supporting SDR. The SDR compatible flag may correspond to the aforementioned sdr_compatibility_flag field.

In the method of transmitting media content according to another embodiment of the present invention, the first WCG information may include content color gamut for providing color gamut information of media content and/or container color gamut information for providing color gamut information used in an encoding procedure of media content. The container/content color gamut information is the same as in the above description. In some embodiments, any one of the two information pieces may not be transmitted but both the two information pieces may be simultaneously transmitted and, thus, the receiver may effectively process color gamut.

In the method of transmitting media content according to another embodiment of the present invention, content color gamut information may further include a WCG-SCG transition flag indicating whether content color gamut of video samples is converted into SCG from WCG in the corresponding track. Here, the WCG-SCG transition flag may correspond to the aforementioned content_wcg_scg_transition_flag field. The content color gamut information may further include a SCG-WCG transition flag indicating whether content color gamut of video samples is converted into WCG from SCG in the corresponding track. Here, the SCG-WCG transition flag may correspond to the aforementioned content_scg_wcg_transition_flag field. The container color gamut information may further include a WCG-SCG transition flag indicating whether container color gamut of video samples is converted into standard color gamut (SCG) from WCG in the corresponding track. Here, the WCG-SCG transition flag may correspond to the aforementioned container_wcg_scg_transition_flag field. The container color gamut information may further include a SCG-WCG transition flag indicating whether container color gamut of video samples is converted into WCG from SCG in the corresponding track. Here, the SCG-WCG transition flag may correspond to the aforementioned container_scg_wcg_transition_flag field.

In the method of transmitting media content according to another embodiment of the present invention, the movie fragment block may further include a movie fragment track header block for providing metadata of a track fragment included in the corresponding fragment. The movie fragment track header block may correspond to the aforementioned tfhd box. The movie fragment track header block may further include second HDR information on video samples of a track fragment. The second HDR information may provide HDR information of video samples of a corresponding track fragment. The HDR information may be HDR information in the aforementioned tfhd box. Here, the HDR information may comply with one of the description format in the aforementioned embodiments.

The HDR flag included in the second HDR information may indicate whether HDR video samples are included in a track fragment. The HDR flag may correspond to a hdr_flag field included in the aforementioned tfhd box. The HDR type flag included in the second HDR information may indicate whether a HDR related parameter of HDR video samples is changed in a corresponding track fragment. The HDR type flag may correspond to a hdr_type_transition_flag field included in the aforementioned tfhd box. The SDR-HDR transition flag of the second HDR information may indicate whether video samples are converted into HDR video samples from SDR video samples in a track fragment. The SDR-HDR transition flag may correspond to a hdr_sdr_transition_flag field included in the aforementioned tfhd box. The HDR-SDR transition flag of the second HDR information may indicate whether video samples are converted into SDR video samples from HDR video samples in a track fragment. The HDR-SDR transition flag may correspond to a sdr_hdr_transition_flag field included in the aforementioned tfhd box. The SDR compatible flag of the second HDR information may indicate whether HDR video samples of a track fragment are compatible with a decoder for supporting SDR. The SDR compatible flag may correspond to a sdr_compatibility_flag field included in the aforementioned tfhd box.

In the method of transmitting media content according to another embodiment of the present invention, the movie fragment block may further include a movie fragment track run block for providing metadata of video samples of a track fragment. The movie fragment track run block may correspond to the aforementioned trun box. The movie fragment track run block may further include third HDR information of video samples. The third DR information may provide HDR information of each of video samples of a corresponding track fragment. The HDR information may be HDR information in the aforementioned trun box. Here, the HDR information may comply with one of the description format in the aforementioned embodiments.

The HDR flag of the third HDR information may indicate whether a corresponding video sample is a HDR video sample for supporting HDR. The HDR flag may correspond to a hdr_type_transition_flag field of the sample_hdr_config box included in the aforementioned trun box. The HDR type flag of the third HDR information may indicate whether a HDR related parameter changed from a corresponding video sample is applied. THE HDR type flag may correspond to the hdr_sdr_transition_flag field of the sample_hdr_config box included in the aforementioned trun box. The SDR-HDR transition flag of the third HDR information may indicate whether the corresponding video sample is converted into a HDR video sample from a SDR video sample. The SDR-HDR transition flag may correspond to the sdr_hdr_transition_flag field of the sample_hdr_config box included in the aforementioned trun box. The HDR-SDR transition flag of the third HDR information may indicate whether the corresponding video sample is converted into a SDR video sample from a HDR video sample. The HDR-SDR transition flag may correspond to the sdr_hdr_transition_flag field of the sample_hdr_config box included in the aforementioned trun box. The SDR compatible flag of the third HDR information may indicate whether a corresponding video sample is compatible with a decoder for supporting SDR. The SDR compatible flag may correspond to the sdr_compatibility_flag field of the sample_hdr_config box included in the aforementioned trun box.

In the method of transmitting media content according to another embodiment of the present invention, when a value of the second HDR information of video samples of a track fragment is different from a value of the third HDR information of each video sample, a value of the third HDR information may be applied to the corresponding video sample. That is, the HDR information defined in the tfhd box may be overridden by HDR information defined with respect to each separate sample in the trun box. That is, the HDR information of the trun box may be preferentially applied.

A method of receiving media content according to an embodiment of the present invention will be described below. The method is not shown in drawings.

The method of receiving media content according to an embodiment of the present invention may include receiving a plurality of segments by a receiver, processing received segments to acquire a media file by a segment processor and acquiring HDR information and WCG information from the media file, and/or displaying media presentation using the acquired information by a display unit.

The method of receiving media content according to an embodiment of the present invention may correspond to the aforementioned method of transmitting media content according to the above embodiment of the present invention. The method of receiving media content may be performed by hardware modules corresponding to modules (e.g., a file generator, a segment processor, and a transmitter) used in the method of transmitting media content. The method of receiving media content may have embodiments corresponding to the aforementioned embodiments of media content.

The aforementioned operations may be omitted or may be replaced with the same/similar operations in some embodiments.

Figure 38:
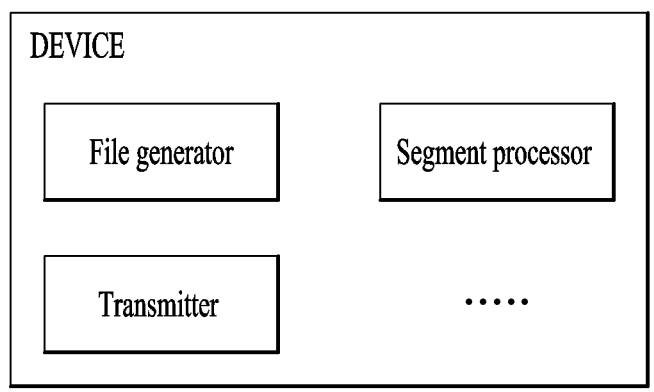
FIG. 38 is a diagram showing a media content transmitting device according to an embodiment of the present invention.

FIG. 38 is a diagram showing a media content transmitting device according to an embodiment of the present invention.

The media content transmitting device according to an embodiment of the present invention may include the aforementioned file generator, segment processor, and/or transmitter. The blocks and the modules are the same as in the above description.

The media content transmitting device and internal modules/blocks thereof according to an embodiment of the present invention may perform the aforementioned method of transmitting media content according to the present invention.

A media content receiving device according to an embodiment of the present invention will be described. The device is not shown in drawings.

The media content receiving device according to an embodiment of the present invention may include the aforementioned receiver, segment processor, and/or display unit. The blocks and modules are the same as in the above description.

The media content receiving and internal modules/blocks thereof according to an embodiment of the present invention may perform the aforementioned method of receiving media content according to the present invention.

The aforementioned block/module, etc. in the device may be processors for performing sequential operations stored in a memory and, in some embodiments, may be hardware elements positioned inside/outside the device.

The aforementioned operations may be omitted or may be replaced with the same/similar operations in some embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of transmitting media content, the method comprising:

generating media files comprising information on presentation of media content, at least one of the media files comprising a movie block comprising metadata of presentation of the media file and a plurality of fragments, the movie block further comprising at least one track block comprising metadata of a track of the presentation, and at least one of the fragments comprising a movie fragment block for providing metadata of presentation of a corresponding fragment and a media data block comprising video samples for presentation of the corresponding fragment, wherein the movie fragment block further comprises a movie fragment track header block for providing metadata of a track fragment included in the corresponding fragment, wherein the movie fragment track header block further comprises second high dynamic range (HDR) information of video samples of the track fragment, wherein a HDR flag of the second HDR information indicates whether HDR video samples are included in the track fragment, wherein a HDR type flag of the second HDR information indicates whether a HDR related parameter of the HDR video samples is changed in a corresponding track fragment, wherein a standard dynamic range-high dynamic range (SDR-HDR) transition flag of the second HDR information indicates whether video samples are converted into HDR video samples from SDR video samples in the track fragment, wherein a HDR-SDR transition flag of the second HDR information indicates whether video samples are converted into SDR video samples from HDR video samples in the track fragment, and wherein a SDR compatible flag of the second HDR information indicates whether the HDR video samples of the track fragment are compatible with a decoder for supporting SDR;

processing the media files to a plurality of segments; and transmitting the plurality of segments, wherein the track block further comprises a track header block for describing characteristics of a corresponding track, and wherein the track header block comprises first HDR information of video samples of the corresponding track or first wide color gamut (WCG) information.

2. The method according to claim 1, wherein the first HDR information comprises:

a HDR flag indicating whether HDR video samples for supporting HDR are included in the corresponding track, a HDR type flag indicating whether a HDR related parameter of the HDR video samples is changed in the corresponding track, a SDR-HDR transition flag indicating whether video samples are converted into HDR video samples from SDR video samples for supporting a SDR in the corresponding track, a HDR-SDR transition flag indicating whether video samples are converted into SDR video samples from HDR video samples in the corresponding track, or a SDR compatible flag indicating whether the HDR video samples of the corresponding track are compatible with a decoder for supporting SDR.

3. The method according to claim 1, wherein the first WCG information comprises content color gamut information for providing color gamut information of the media content and container color gamut information for providing color gamut information used in an encoding procedure of the media content.

4. The method according to claim 3, wherein the content color gamut information comprises a wide color gamut-standard color gamut (WCG-SCG) transition flag indicating whether content color gamut of video samples is converted into SCG from WCG in the corresponding track or a SCG-WCG transition flag indicating whether content color gamut of video samples is converted into WCG from SCG in the corresponding track, and wherein the container color gamut information comprises a WCG-SCG transition flag indicating whether container color gamut of video samples is converted into SCG from WCG in the corresponding track or a SCG-WCG transition flag indicating whether container color gamut of video samples is converted into WCG from SCG in the corresponding track.

5. The method according to claim 1, wherein the movie fragment block further comprises a movie fragment track run block for providing metadata of video samples of the track fragment, wherein the movie fragment track run block further comprises third HDR information of each of the video samples, wherein a HDR flag of the third HDR information indicates whether a corresponding video sample is a HDR video sample for supporting HDR, wherein a HDR type flag of the third HDR information indicates whether a HDR related parameter changed from the corresponding video sample is applied, wherein a SDR-HDR transition flag of the third HDR information indicates whether the corresponding video sample is converted into a HDR video sample from a SDR video sample, wherein a HDR-SDR transition flag of the third HDR information indicates whether the corresponding video sample is converted into a SDR video sample from a HDR video sample, and wherein a SDR compatible flag of the third HDR information indicates whether the corresponding video sample is compatible with a decoder for supporting SDR.

6. The method according to claim 5, wherein, when a value of the second HDR information of video samples of the track fragment is different a value of the third HDR information of each of video samples, the value of the third HDR information is applied to a corresponding video sample.

7. A media content transmitting device comprising:

a file generator configured to generate media files comprising information on presentation of media content, at least one of the media files comprising a movie block comprising metadata of presentation of the media file and a plurality of fragments, the movie block further comprising at least one track block comprising metadata of a track of the presentation, and at least one of the fragments comprising a movie fragment block for providing metadata of presentation of a corresponding fragment and a media data block comprising video samples for presentation of the corresponding fragment, wherein the movie fragment block further comprises a movie fragment track header block for providing metadata of a track fragment included in the corresponding fragment, wherein the movie fragment track header block further comprises second high dynamic range (HDR) information of video samples of the track fragment, wherein a HDR flag of the second HDR information indicates whether HDR video samples are included in the track fragment, wherein a HDR type flag of the second HDR information indicates whether a HDR related parameter of the HDR video samples is changed in a corresponding track fragment, wherein a standard dynamic range-high dynamic range (SDR-HDR) transition flag of the second HDR information indicates whether video samples are converted into HDR video samples from SDR video samples in the track fragment, wherein a HDR-SDR transition flag of the second HDR information indicates whether video samples are converted into SDR video samples from HDR video samples in the track fragment, and wherein a SDR compatible flag of the second HDR information indicates whether the HDR video samples of the track fragment are compatible with a decoder for supporting SDR;

a segment processor configured to process the media files to a plurality of segments; and a transmitter configured to transmit the plurality of segments, wherein the track block further comprises a track header block for describing characteristics of a corresponding track, and
wherein the track header block comprises first HDR information of video samples of the corresponding track or first wide color gamut (WCG) information.

8. The media content transmitting device according to claim 7, wherein the first HDR information comprises:
a HDR flag indicating whether HDR video samples for supporting HDR are included in the corresponding track,
a HDR type flag indicating whether a HDR related parameter of the HDR video samples is changed in the corresponding track,
a SDR-HDR transition flag indicating whether video samples are converted into HDR video samples from SDR video samples for supporting a SDR in the corresponding track,
a HDR-SDR transition flag indicating whether video samples are converted into SDR video samples from HDR video samples in the corresponding track, or
a SDR compatible flag indicating whether the HDR video samples of the corresponding track are compatible with a decoder for supporting SDR.

9. The media content transmitting device according to claim 7, wherein the first WCG information comprises content color gamut information for providing color gamut information of the media content and container color gamut information for providing color gamut information used in an encoding procedure of the media content.

10. The media content transmitting device according to claim 9, wherein the content color gamut information comprises a wide color gamut-standard color gamut (WCG-SCG) transition flag indicating whether content color gamut of video samples is converted into SCG from WCG in the corresponding track or a SCG-WCG transition flag indicating whether content color gamut of video samples is converted into WCG from SCG in the corresponding track, and
wherein the container color gamut information comprises a WCG-SCG transition flag indicating whether container color gamut of video samples is converted into SCG from WCG in the corresponding track or a SCG-WCG transition flag indicating whether container color gamut of video samples is converted into WCG from SCG in the corresponding track.

11. The media content transmitting device according to claim 7, wherein the movie fragment block further comprises a movie fragment track run block for providing metadata of video samples of the track fragment,
wherein the movie fragment track run block further comprises third HDR information of each of the video samples,
wherein a HDR flag of the third HDR information indicates whether a corresponding video sample is a HDR video sample for supporting HDR,
wherein a HDR type flag of the third HDR information indicates whether a HDR related parameter changed from the corresponding video sample is applied,
wherein a SDR-HDR transition flag of the third HDR information indicates whether the corresponding video sample is converted into a HDR video sample from a SDR video sample,
wherein a HDR-SDR transition flag of the third HDR information indicates whether the corresponding video sample is converted into a SDR video sample from a HDR video sample, and
wherein a SDR compatible flag of the third HDR information indicates whether the corresponding video sample is compatible with a decoder for supporting SDR.

12. The media content transmitting device according to claim 11, wherein, when a value of the second HDR information of video samples of the track fragment is different a value of the third HDR information of each of video samples, the value of the third HDR information is applied to a corresponding video sample.

* * * * *